US012373769B1

(12) United States Patent
Boeck et al.

(10) Patent No.: US 12,373,769 B1
(45) Date of Patent: Jul. 29, 2025

(54) MACHINE LEARNING-BASED PREDICTION OF EQUIPMENT ARRIVAL TIMES IN A RAILROAD NETWORK

(71) Applicant: Telegraph System, Inc., Chicago, IL (US)

(72) Inventors: Thomas Boeck, Los Angeles, CA (US); Lucas Scavone, Austin, TX (US); Amaro Luna, Berkeley, CA (US); Harris Ligon, Chicago, IL (US)

(73) Assignee: Telegraph System, Inc., Chicago, IL (US)

( * ) Notice: Subject to any disclaimer, the term of this patent is extended or adjusted under 35 U.S.C. 154(b) by 0 days.

(21) Appl. No.: 18/815,169

(22) Filed: Aug. 26, 2024

(51) Int. Cl.
    G06Q 10/0833 (2023.01)
    G06Q 50/40 (2024.01)

(52) U.S. Cl.
    CPC ......... *G06Q 10/0833* (2013.01); *G06Q 50/40* (2024.01)

(58) Field of Classification Search
    None
    See application file for complete search history.

(56) References Cited

U.S. PATENT DOCUMENTS

| 9,849,896 | B1 | 12/2017 | Painter et al. | |
|---|---|---|---|---|
| 11,085,792 | B2 | 8/2021 | Zhong et al. | |
| 2009/0173839 | A1* | 7/2009 | Groeneweg | B61L 27/53 246/15 |
| 2014/0244143 | A1* | 8/2014 | Elwart | G01C 21/3492 701/465 |
| 2018/0060808 | A1* | 3/2018 | Borgerson | G06Q 10/0831 |
| 2023/0004931 | A1* | 1/2023 | Con | G06Q 10/0838 |
| 2023/0087643 | A1 | 3/2023 | Oh et al. | |
| 2024/0085205 | A1* | 3/2024 | Jonietz | G06N 5/022 |
| 2024/0095611 | A1* | 3/2024 | Dzugan | G06N 20/20 |
| 2024/0109564 | A1* | 4/2024 | Swar | B61L 15/0027 |
| 2024/0157988 | A1 | 5/2024 | Hilleary | |

FOREIGN PATENT DOCUMENTS

| AU | 2007333518 A1 | 6/2008 |
|---|---|---|
| AU | 2022202836 A1 | 1/2023 |
| BR | 102022010698 A2 | 1/2023 |

(Continued)

OTHER PUBLICATIONS

Claes et al.; "Ad hoc link traversal time prediction"; Nov. 17, 2011; IEEE; pp. 1803-1808 (Year: 2011).*

*Primary Examiner* — Jeff Zimmerman
*Assistant Examiner* — Jorge G Del Toro-Ortega
(74) *Attorney, Agent, or Firm* — Sikander M. Khan

(57) ABSTRACT

Systems and methods for predicting an estimated time of arrival for an equipment at a destination location are disclosed. The method includes inputting to a trained machine learning model a starting location, the destination location and at least one event data, generated in response to an event during a trip of the equipment via the railroad from the starting location to the destination location. The machine learning model is trained using a plurality of historical shipment route data. A particular historical shipment route data comprises at least a location and a corresponding timestamp. The method includes predicting, using the trained machine learning model, the estimated time of arrival of the equipment at the destination location.

22 Claims, 17 Drawing Sheets

(56) References Cited

FOREIGN PATENT DOCUMENTS

| | | | |
|---|---|---|---|
| CA | 3175502 | A1 | 12/2022 |
| CA | 3219650 | A1 | 5/2024 |
| CN | 106274994 | B | 1/2017 |
| CN | 111523802 | B | 8/2020 |
| CN | 111626477 | A | 9/2020 |
| CN | 110537212 | B | 6/2022 |
| CN | 111626477 | B | 8/2022 |
| CN | 115545266 | A | 12/2022 |
| CN | 114944059 | B | 11/2023 |
| CN | 115056829 | A | 9/2024 |
| DE | 102022116076 | A1 | 1/2023 |
| EP | 4151498 | A2 | 3/2023 |
| FR | 3124858 | A1 | 1/2023 |
| GB | 2610277 | A | 3/2023 |
| JP | 2017177923 | A | 10/2017 |
| JP | 6573568 | B2 | 9/2019 |
| JP | 2021098425 | A | 7/2021 |
| JP | 2023103847 | A | 7/2023 |
| KR | 20230041885 | B1 | 4/2024 |
| KR | 20230041907 | B1 | 4/2024 |
| TW | 201901185 | A | 4/2020 |
| WO | 2018213996 | A1 | 11/2018 |

\* cited by examiner

Calculated Data 160

- Junction-Level Congestion Data 242: Predicted Time, Junction Name / ID, Expected Traffic (Number of Trains)
- Track-Level Congestion Data 244: Predicted Time, Location, Expected Traffic (Number of Trains)
- Seasonality Data 246: Hour of Day, Day of Week, Month of Year, Busy Hour Indicator, Off Hour Indicator Examples of Calculated Data

FIG. 2C

Example of Railroad Data

Part 1/3 — 301

| 302 Waybill ID | 303 Train ID | 304 Equipment ID | 305 Location | 306 Scheduled Timestamp | 307 Hour of Day | 308 Day of Week | 309 Month of Year | 310 Year |
|---|---|---|---|---|---|---|---|---|
| 12345 | XXXXX | 54321 | San Francisco, CA | 2023-05-01 6:15:00 | 6 | 2 | 5 | 2023 |
| 12345 | XXXXX | 54321 | Boston, MA | 2023-05-02 6:15:00 | 6 | 3 | 5 | 2023 |
| 12345 | XXXXX | 54321 | Austin, TX | 2023-05-03 6:15:00 | 6 | 4 | 5 | 2023 |
| 12345 | XXXXX | 54321 | San Francisco, CA | 2023-05-04 6:15:00 | 6 | 5 | 5 | 2023 |
| 12345 | XXXXX | 54321 | Boston, MA | 2023-05-05 6:15:00 | 6 | 6 | 5 | 2023 |
| 12345 | XXXXX | 54321 | Austin, TX | 2023-05-06 6:15:00 | 6 | 7 | 5 | 2023 |

Part 2/3 — 311

| 312 Scheduled Crew Change | 314 Scheduled Inspection | 315 Train Type | 316 Commodity Type | 317 Equipment Type | 318 Train Length | 319 Train Cars |
|---|---|---|---|---|---|---|
| 1 | 1 | A | B | C | 5000 | 88 |
| 0 | 0 | A | B | C | 5000 | 88 |
| 0 | 0 | A | B | C | 5000 | 88 |
| 1 | 0 | A | B | C | 5000 | 88 |
| 1 | 0 | A | B | C | 5000 | 88 |
| 1 | 0 | A | B | C | 5000 | 88 |

Part 3/3 — 321

| 320 Scheduled Pick Up | 323 Scheduled Set Out | 324 Loaded/Empty Indicator |
|---|---|---|
| 1 | 0 | L |
| 1 | 0 | L |
| 0 | 0 | L |
| 0 | 1 | E |
| 0 | 1 | E |
| 0 | 1 | E |

FIG. 3A

Example of Lane History Data

| Origin | Destination | Avg. Trip Time | Median Trip Time | Median Trip Time Last 90 Days | Median Trip Time Last 180 Days |
|---|---|---|---|---|---|
| Los Angeles, CA | Chicago, IL | 7 | 5 | 4.5 | 4.8 |
| San Francisco, CA | Austin, TX | 6 | 4.3 | 5.8 | 5 |

FIG. 3B

Example of Track Repair Disruptions

| 342 Location | 343 Start Time | 344 End Time | 345 Cause | 346 Train ID |
|---|---|---|---|---|
| San Francisco, CA | 3/1/2024 | 3/3/2024 | track repair | XXXXY |
| Boston, MA | 3/1/2024 | 3/3/2024 | derailment | XXXXX |
| Austin, TX | 3/1/2024 | 3/3/2024 | track repair | YXXXX |

Example of Calculated Junction-Level Congestion Data

| Predicted timepoint | Junction | Expected Traffic (n_trains) |
|---|---|---|
| 5/20/2024 6:00 | Chicago, IL | 15 |
| 5/20/2024 12:00 | Chicago, IL | 7 |
| 5/20/2024 18:00 | Chicago, IL | 3 |
| 5/20/2024 6:00 | Austin, TX | 12 |
| 5/20/2024 12:00 | Austin, TX | 12 |
| 5/20/2024 18:00 | Austin, TX | 6 |
| 5/20/2024 6:00 | Los Angeles, CA | 14 |
| 5/20/2024 12:00 | Los Angeles, CA | 5 |
| 5/20/2024 18:00 | Los Angeles, CA | 2 |

FIG. 3D

Example of Calculated Track-Level Congestion Data

| Predicted Timepoint | Location | Expected Traffic (n_trains) |
|---|---|---|
| 5/20/2024 6:00 | (29.95629, -97.442271) | 15 |
| 5/20/2024 12:00 | (29.95629, -97.442271) | 7 |
| 5/20/2024 18:00 | (29.95629, -97.442271) | 3 |
| 5/20/2024 6:00 | (30.721532, -87.308517) | 12 |
| 5/20/2024 12:00 | (30.721532, -87.308517) | 12 |
| 5/20/2024 18:00 | (30.721532, -87.308517) | 6 |
| 5/20/2024 6:00 | (34.467708, -99.655792) | 14 |
| 5/20/2024 12:00 | (34.467708, -99.655792) | 5 |
| 5/20/2024 18:00 | (34.467708, -99.655792) | 2 |

FIG. 3E

Examples of Raw Event Data from Railroad Companies (1/3)

371

| Equipment_ID | Event_Timestamp | Event_Code | Event_SPLC |
|---|---|---|---|
| ABCX123456 | 2024-04-26 19:50:00 | W | 534485000 |
| ABCX123456 | 2024-04-26 20:05:00 | X | 534485000 |
| ABCX123456 | 2024-04-26 20:36:00 | A | 534465000 |
| ABCX123456 | 2024-04-26 20:54:00 | J | 534450000 |
| ABCX123456 | 2024-04-26 21:51:00 | P | 534450000 |
| ABCX123456 | 2024-04-26 21:55:00 | P | 383826000 |
| ABCX123456 | 2024-04-27 1:26:00 | A | 382870000 |
| ABCX123456 | 2024-04-27 9:17:00 | P | 382870000 |
| ABCX123456 | 2024-04-27 12:38:00 | P | 380213000 |
| ABCX123456 | 2024-04-27 12:49:00 | J | 380001000 |
| ABCX123456 | 2024-04-27 15:08:00 | R | 380001000 |
| ABCX123456 | 2024-04-27 15:09:00 | P | 363504000 |
| ABCX123456 | 2024-04-27 16:24:00 | P | 363232000 |
| ABCX123456 | 2024-04-27 17:09:00 | P | 362435000 |
| ABCX123456 | 2024-04-27 18:06:00 | P | 362440000 |
| ABCX123456 | 2024-04-27 18:29:00 | P | 362120000 |
| ABCX123456 | 2024-04-27 18:36:00 | A | 362120000 |
| ABCX123456 | 2024-04-28 5:43:00 | J | 362140000 |
| ABCX123456 | 2024-04-28 6:52:00 | P | 343570000 |
| ABCX123456 | 2024-04-28 9:09:00 | D | 343570000 |
| ABCX123456 | 2024-04-28 10:42:00 | Z | |

FIG. 3F

Location Data Determined Using Raw Event Data From Railroad Companies (2/3)

| Event_Description | City | State | Country | Station | Junction |
|---|---|---|---|---|---|
| Released | CALAMUS | IA | US | CALAMUS | |
| Pull from Patron | CALAMUS | IA | US | CALAMUS | |
| Intransit Arrival | BROPHY | IA | US | BROPHY | |
| Junction Delivery | CLINTON | IA | US | CLINTON | CLTON |
| Departure | CLINTON | IA | US | CLINTON | CLTON |
| Departure | UNION GROVE | IL | US | UNION GROVE | |
| Intransit Arrival | GLOBAL 3 | IL | US | GLOBAL 3 | GLBAL |
| Departure | GLOBAL 3 | IL | US | GLOBAL 3 | GLBAL |
| Departure | KEDZIE | IL | US | KEDZIE | |
| Junction Delivery | CHICAGO ASHLAND | IL | US | N/A | ASHAA |
| Junction Received | CHICAGO ASHLAND | IL | US | N/A | ASHAA |
| Departure | CHICAGO ASHLAND | IL | US | N/A | ASHAA |
| Departure | WHITING | IN | US | WHITING | WHTNG |
| Departure | BURDICK | IN | US | N/A | |
| Departure | TERRE COUPEE | IN | US | TERRE COUPEE | TERCO |
| Departure | MISHAWAKA | IN | US | MISHAWAKA | |
| Intransit Arrival | ELKHART CN | IN | US | N/A | ELKHR |
| Junction Delivery | ELKHART CN | IN | US | N/A | ELKHR |
| Departure | GOSHEN | IN | US | N/A | |
| Destination Arrival | BRYAN | OH | US | BRYAN | |
| Actual Placement | BRYAN | OH | US | BRYAN | |

FIG. 3G

Lookup Data from Waybill (3/3)

| Waybill_Number | Waybill_Date | Origin_SPLC | Destination_SPLC | Transportation_Type |
|---|---|---|---|---|
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |
| 654321 | 2024-04-26 | 534485000 | 343570000 | Railcar |

Single Raw Event Data Example

Example of Raw Event Data from Railroad Companies (1/3)

| Equipment_ID | Event_Timestamp | Event_Code | Event_SPLC |
|---|---|---|---|
| ABCX123456 | 2024-04-26 19:50:00 | W | 534485000 |

Location Lookup Data from Raw Event Data From Railroad Companies (2/3)

| Event_Description | City | State | Country | Station | Junction |
|---|---|---|---|---|---|
| Released | CALAMUS | IA | US | CALAMUS | |

Lookup Data from Waybill (3/3)

| Waybill_Number | Waybill_Date | Origin_SPLC | Destination_SPLC | Transportation_Type |
|---|---|---|---|---|
| 654321 | 2024-04-26 | 534485000 | 343570000 | Railcar |

FIG. 3I

MACHINE LEARNING-BASED PREDICTION OF EQUIPMENT ARRIVAL TIMES IN A RAILROAD NETWORK

BACKGROUND

Field

The technology disclosed relates to artificial intelligence type computers and digital data processing systems and corresponding data processing methods and products for emulation of intelligence (i.e., knowledge-based systems, reasoning systems, and knowledge acquisition systems); and includes systems for reasoning with uncertainty (e.g., fuzzy logic systems), adaptive systems, machine learning systems, and artificial neural networks. In particular, the technology disclosed relates machine learning-based tracking of railroad equipment.

Description of Related Art

Railroads play an important role in commerce and business activities in a country. Farms, factories, ports, refineries, supermarkets and many other businesses rely on freight trains for cost effective transportation of raw materials and finished goods. Businesses need reliable estimates for departure and delivery of goods at desired destinations. Railroads provide estimated time of arrival (or ETA) of goods at the destination when goods are shipped from an origin location. However, the actual ETAs often vary from the planned ETAs by several days. Incorrect ETAs can cause huge loss to businesses in their operations and may also cause loss of goods when the cargo comprises perishable items. Railroads often provide ETAs based on their internal performance metrics. However, these ETAs are not regularly updated based on various events that occur during the trip of the equipment that are carrying the goods.

It is desirable to provide a system that can reliably predict the estimated time of arrival of goods at the destination location.

SUMMARY

A method for predicting an estimated time of arrival (ETA) for an equipment at a destination location or an interchange point via a railroad is disclosed. The method includes inputting to a trained machine learning model shipment data that includes a starting (or a current) location, the destination location and at least one event data generated in response to an event during a trip of the equipment via the railroad from the starting location to the destination location. The machine learning model can be trained using a plurality of historical shipment route data. A particular historical shipment route data in the plurality of historical shipment route data can comprise at least a location and a corresponding timestamp in the particular historical shipment route from a particular starting location to a particular destination location The method includes predicting, using the trained machine learning model, the ETA of the equipment at the destination location.

The historical shipment route data can include data related to previous trips of equipment between various starting (or origin) and destination locations. The data can include location identifiers or locations names and corresponding timestamps at which the equipment reached a particular location or passed through a particular location. The technology disclosed includes logic to calculate the trip times data i.e., the duration of trips between various starting and destination locations. Other types of data related to historical shipment route data can be calculated from data received from railroads. Examples of such data include congestion data, seasonality data, etc. Such data can be used to train the machine learning model for predicting the ETA to any location in the trip of the equipment.

The event can identify at least one of a location arrival event, a location departure event and a location update event. A location can be a junction or an interchange or any other location along the trip route of the equipment. A location update event can indicate movement of the equipment at a location or in proximity to a location. The location can be referred to by respective geographical coordinates such as latitude and longitude values. The location may also be referred to by respective name or an identifier such as a junction name, interchange name, single point location code (SPLC), etc.

In one implementation, the method includes inputting to the trained machine learning model an equipment type data indicating a type of the equipment moving a cargo from the starting location to the destination location. The equipment type can identify at least one of an intermodal container, a railcar, a tank car, a box car, a refrigerated boxcar, a covered hopper, an open-top hopper, a grain container, an autorack, a centerbeam, a coil car, a flatcar, a gandola and a well car.

The destination location can be at least one of a second last location, a last location or an intermediate location in the trip route of the equipment comprising a plurality of locations. A location in the plurality of locations in the trip route of the equipment can be an interchange point or a junction. An interchange or a junction is a location where one railroad connects with one or more other railroads. The technology disclosed includes logic to predict, using the trained machine learning model, an estimated time of arrival (or ETA) at any location along the trip route from any starting location along the trip route of the equipment. In some cases, the second last location along the trip route can be the last junction at which the class one railroad hands over the equipment to the shortline for transporting the equipment to the destination. In such cases, the estimated time to arrival at this junction can also be referred to as an estimated time to interchange (or ETI).

In one implementation, the method includes predicting an updated estimated time of arrival (ETA) of the equipment at a location (such as a destination or a junction) by inputting, to the trained machine learning model, at least one new event data, generated in response to a new event during the trip of the equipment from the starting location to the destination location. The new event can be at least one of an arrival event indicating arrival of the equipment at a location (such as an in-transit railroad location), a departure event indicating departure of the equipment from the location (such as an in-transit railroad location), a delay or a hold event indicating the delay of the equipment at a location (such as an in-transit railroad location), a junction delivery event indicating delivery of the equipment from one railroad to another railroad, a junction receipt event indicating receipt of the equipment by one railroad from another railroad, a storage event indicating storage of the equipment and a location update event indicating movement of the equipment.

The event data can comprise at least a time, a date and a location of the event.

The trained machine learning model can predict an ETA of the equipment at any location along the trip route of the equipment using any event generated by the railroad when the equipment is moving or dwelling during the trip. The event data including the timestamp (including the day and/or the time of the day) and location can be provided as input to the trained machine learning model to predict the ETA at any other location along the trip route of the equipment.

In one implementation, the method includes inputting to the trained machine learning model, at least one event data generated in response to a scheduling event during the trip of the equipment. The historical trip times data used to train the machine learning model can further include a plurality of historical schedule data, a particular historical schedule data comprises at least one event data generated in response to the scheduling event.

The scheduling event can include at least one of a train switches event indicating the switching of the equipment from one railroad to another railroad, a crew changes event indicating changes of the crew during the trip of the equipment, a work order event indicating part replacement or inspection of the equipment, a pickup event indicating adding of the equipment to the train and a setout event indicating removal of the equipment from the train.

The new event can be at least one of a junction-level congestion event indicating delay to movement of the equipment at a junction and a track-level congestion event indicating delay to movement of the equipment at a particular portion of the railroad during the trip from the starting location to the destination location.

Determination of the junction-level congestion can further include the following operations. The method includes determining a number of trains that are scheduled (or otherwise predicted) on at least one junction in the railroad during a specified future time interval. The method includes calculating, using the determined number of trains, an average and/or a maximum amount of junction congestion along a lane for a particular waybill.

The particular waybill can further include an identifier of at least one junction, an identifier of at least one class one railroad and an identifier of at least one last mile track (or shortline railroad).

Determination of the track-level congestion can further include the following operations. The method includes determining a number of trains that are scheduled (or otherwise predicted) on at least one location in the railroad during a specified future time interval. The method includes calculating, using the determined number of trains, an average and/or a maximum amount of track-level congestion along a lane for a particular waybill.

In one implementation, the method includes inputting to the trained machine learning model a length of a train for predicting the ETA. The length of the train is determined by a number of equipment in the train such as a number or railcars and/or a number of intermodal containers, etc.

In one implementation, the method includes inputting to the trained machine learning model a Boolean flag indicating whether the equipment is loaded with cargo or if it is an empty trip with no cargo in the equipment.

In one implementation, the method includes inputting to the trained machine learning model a commodity type wherein the commodity type indicates a type of cargo being transported by the equipment.

In one implementation, the method includes inputting to the trained machine learning model a seasonality data associated with at least one of the location (or junction) departure event and/or the location (or junction) arrival event. The seasonality data can comprise at least one of a time of a day, a day of a week, a month of a year and a Boolean for indicating a higher-than-average traffic at the location. The location can be a junction or an interchange or any other location along with trip route of the equipment.

A system including one or more processors coupled to memory is provided. The memory is loaded with computer instructions to predict an estimated time of arrival (ETA) for an equipment at a destination location via a railroad. The instructions, when executed on the one or more processors, implement operations presented in the method described above. Each of the features discussed in this section for the method implementation apply equally to this system implementation. As indicated above, all the system features are not repeated here and should be considered repeated by reference.

Each of the features discussed in this section for the first method implementation apply equally to the second method implementation. As indicated above, all the features of the first method implementation are not repeated here and should be considered repeated by reference.

A second method of predicting an estimated time of arrival for an equipment via a railroad is disclosed. The method includes inputting to a trained machine learning model a starting location, a destination location, at least one event data generated in response to an event during a trip of the equipment via the railroad from the starting location to the destination location. The method includes inputting an equipment type data to the machine learning model, The equipment type data indicates a type of the equipment moving a cargo from the starting location to the destination location. The machine learning model can be trained using a plurality of historical shipment route data. A particular historical shipment route data in the plurality of historical shipment route data comprises at least a location and a corresponding timestamp in the particular historical shipment route from a particular starting location to a particular destination location. The method includes predicting, using the trained machine learning model, the estimated time of arrival of the equipment at the destination location.

The particular historical shipment route data in the plurality of historical shipment route data can match at least a portion (or a segment) of the trip of the equipment from the starting location to the destination location.

Each of the features discussed in this section for the first method implementation apply equally to the second method implementation. As indicated above, all the features of the first method implementation are not repeated here and should be considered repeated by reference.

A third method is provided for predicting an estimated time of arrival at the interchange or estimated time to interchange (ETI) for an equipment at a destination location via a railroad. The ETI is predicted for a last interchange along the trip route before the equipment is handed over from class one railroad to a shortline. This interchange can be the second last interchange or junction in the trip route of the equipment. The method includes inputting to a trained machine learning model a starting location, the destination location prior to the shortline and at least one event data. The event data can be generated in response to an event during a trip of the equipment via the railroad from the starting location to the destination location. The machine learning model can be trained using a plurality of historical shipment route data. A particular historical shipment route data in the plurality of historical shipment route data can comprise at least a location and a corresponding timestamp in the particular historical shipment route from a particular starting location to a particular destination location. The method includes predicting, using the trained machine learning model, the estimated time of arrival of the equipment at the destination location. Each of the features discussed in this section for the first method implementation apply equally to this method implementation. As indicated above, all the features of the first method implementation are not repeated here and should be considered repeated by reference.

Another system including one or more processors coupled to memory is provided. The memory is loaded with computer instructions to predict an estimated time to interchange (ETI) for an equipment at a destination location (such as an interchange or a junction) via a railroad. The instructions, when executed on the one or more processors, implement operations presented in the method described above. Each of the features discussed in this section for the first method implementation apply equally to this system implementation. As indicated above, all the features of the first method implementation are not repeated here and should be considered repeated by reference.

Computer program products which can execute the methods presented above are also described herein (e.g., a non-transitory computer-readable recording medium having a program recorded thereon, wherein, when the program is executed by one or more processors the one or more processors can perform the methods and operations described above).

Other aspects and advantages of the present invention can be seen on review of the drawings, the detailed description and the claims, which follow.

BRIEF DESCRIPTION OF THE DRAWINGS

FIG. 2C presents examples of various types of calculated data that can be used for predicting ETA and ETI for railroad equipment.

FIG. 3A presents example railroad data and calculated data that can be used for predicting ETA and ETI for railroad equipment.

FIG. 3B presents example lane history data that can be used for predicting ETA and ETI for railroad equipment.

FIG. 3C presents examples of railroad track repair disruptions data that can be used for predicting ETA and ETI for railroad equipment.

FIG. 3D presents examples of calculated junction-level congestion data that can be used for predicting ETA and ETI for railroad equipment.

FIG. 3E presents examples of calculated track-level congestion data that can be used for predicting ETA and ETI for railroad equipment.

FIG. 3F presents examples of raw event data received from railroad companies.

FIG. 3G presents examples of location data determined from raw event data of FIG. 3F.

FIG. 3H presents examples of Waybill data determined from raw data of FIG. 3F.

FIG. 3I presents an example raw event data using the data presented in FIGS. 3F to 3H.

DETAILED DESCRIPTION

Figure 1A:
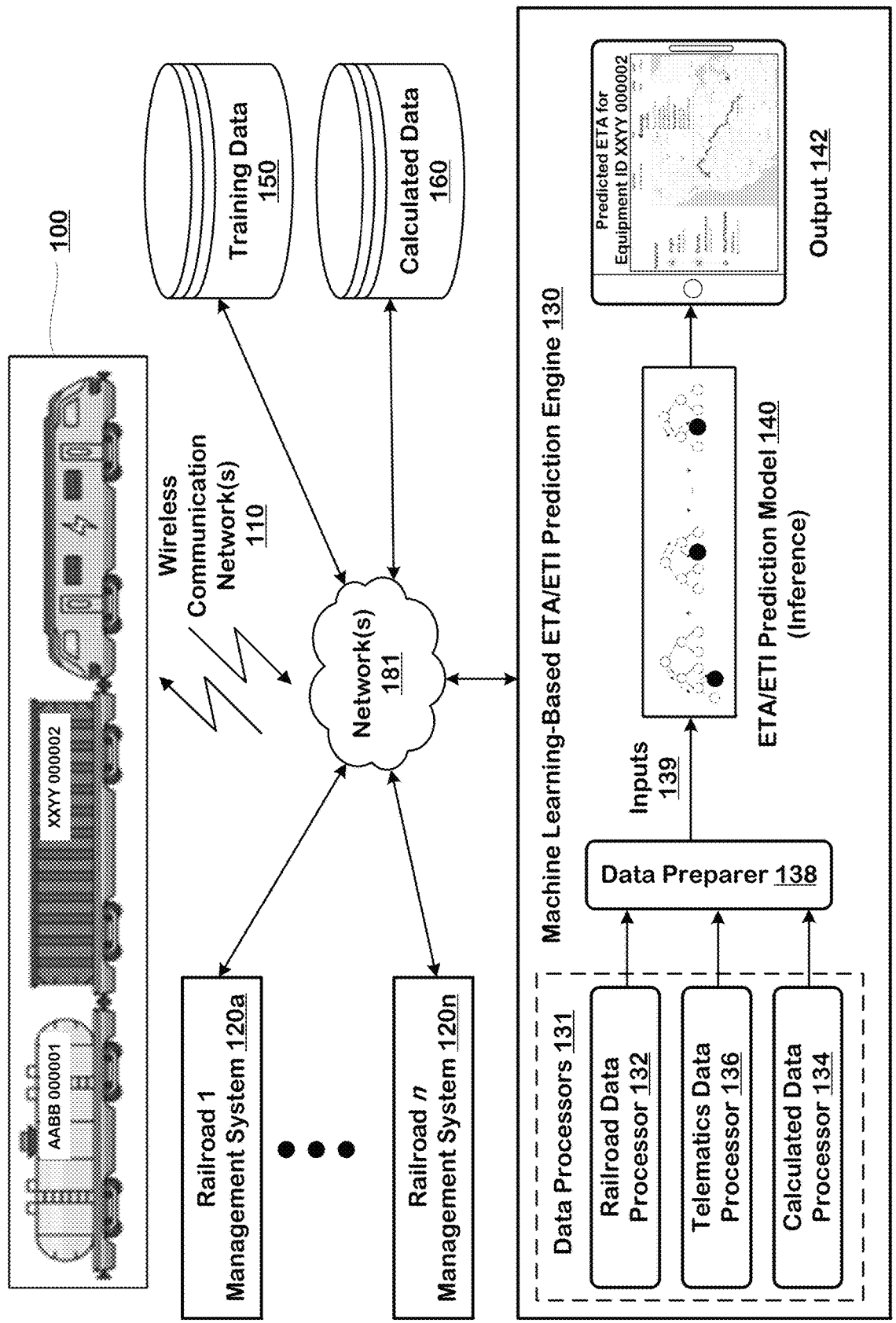
FIG. 1A illustrates an example architectural-level schematic of a system that uses a trained machine learning model to predict, for a railroad equipment, an estimated time of arrival (ETA) and an estimated time to interchange (ETI).

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

Introduction

Railroads can be considered an economic backbone of a country. Freight railroads transport around forty percent of all freight volume across the United States which is more than any other mode of transportation. Similarly, seventy percent of intercity surface freight and around half of Canada's export goods are transported by railroad. Efficient transportation of goods via railroads is desirable for growth and development of a modern economy as it provides a relatively cheap mode for transporting goods to and from ports to various inland destinations. Due to various factors, the freight transported by a railroad may be delayed or incorrectly routed. This can cause huge economic losses to freight owners, industries, farmers, railroad companies, etc.

A railroad can be considered as a system of tracks with trains, organization and personnel required for its working. A train can comprise one or more locomotives (also referred to as engines) and one or more equipment attached to the engine. A freight train can have a variety of car types such as railcars, grain cars, oil tanks, intermodal containers, etc. A modal type (or equipment type) defines the type of equipment that is carrying the freight on a railcar. For example, an intermodal container is one type of equipment that can be placed on a railcar for transporting goods. The intermodal containers can be transported via other modes of transportation as well such as ships or trucks, etc. A tank car is another type of equipment that can be used to transport liquid goods (oil, liquefied gas, chemicals, etc.). A tank car, however, only operates on a railroad track. A grain car is used to transport grain (such as wheat, corn, etc.).

Railroad companies generate a waybill document when transporting freight from an origin (or source) location to a destination location. The waybill includes standard (or single) point location codes (or SPLCs) for all physical stations including the origin location along the way to the destination location of the equipment. The waybill can also include an estimated arrival date for the equipment at the destination location. However, in many instances, the actual arrival date of the equipment at the destination location is several days later than the estimated date of arrival. In some cases, the equipment gets routed to an incorrect location from one of the intermediate junctions.

A junction (or an interchange) is a location on a railway track at which track crossings take place. The routing through a junction can be controlled by signals and interlocking. A junction or an interchange may connect two or more different railroads. In this case, the equipment may be handed over from one railroad to another railroad. In some cases, equipment can sit idle (referred to as dwelling) at a junction for a longer period of time than planned in the initial trip plan provided by the waybill. Dwelling may lead to extra cost for the freight owner or shipper (or consignee) for the equipment. This may be due to late return of the equipment to the railroad after emptying the goods at the destination and/or due to late arrival of goods at the destination. In some cases, the goods in the equipment can comprise perishable items that may go to waste if the equipment does not reach its destination within a desired period of time. While the equipment is dwelling at a junction or moving towards an incorrect destination, the shipper (or consignee) may not get any information about the location and/or the status of the goods and/or the equipment until it reaches an incorrect destination or sits idle for a long period of time. This can usually be many days beyond the estimated time of arrival or arrival date of the equipment at the destination location. The estimated time of arrival (ETA) provided by railroad companies is often off by several days from the actual arrival date of the equipment at the destination stations, i.e., the equipment arrives several days later than the ETA provided in the waybill.

There are various reasons for such a large disparity between estimated ETA provided and the actual arrival date of the equipment. One of the reasons for incorrect ETAs is due to the static nature of waybill document provided by railroad companies. The ETA provided in the waybill may not be updated during the trip (or journey) of the equipment as the equipment faces delays due to various reasons. In some cases, the ETA provided in the waybill may be updated only once or twice during the trip of the equipment. The railroad companies provide ETAs based on their internal performance metrics and may add additional time to the estimated time for an equipment to travel from an origin location to a destination location. This is to allow equipment to arrive at the destination location before the ETA provided by the railroad company even if there are delays during the journey. However, this method of determining an ETA may provide incorrect results. Therefore, systems and methods to track railroad equipment are desired that can provide an accurate status of the equipment to the shipper during the trip. Additionally, it is desired that such systems and methods update the estimated time of arrival (ETA) of the equipment based on the current status and/or location of the equipment on the railroad track.

Trained machine learning models are disclosed herein to predict the estimated time of arrival (ETA) for an equipment that is orders of magnitude better than the estimated ETA provided by railroad companies. The technology disclosed gathers data from a wide variety of sources for predicting ETA for an equipment. Additionally, the technology disclosed also predicts an estimated time of arrival of the equipment at the final junction (ETI) prior to the destination location. The waybill document does not provide ETI for the equipment. The equipment is usually transported from the last junction to the destination location via a shortline railroad. At the last junction a class one (or Class 1) railroad hands over the equipment to the shortline railroad that takes the equipment to the destination location where it is handed over to the consignee. A class one railroad is a large railroad company that operates freight trains on a national railroad network. The shortline railroad (also referred to as last mile) is a small or mid-sized railroad company that operates on relatively short distances relative to the larger national railroad networks. The ETI information is useful for shortlines as in most cases, they need to take the delivery of the equipment from class one railroad at the last junction. The consignee needs to send a crew at the destination to take the delivery of the equipment from the shortline railroad. With accurate ETI predictions, the technology disclosed can save time and resources of the consignee and shortlines. In some cases, the equipment can reach the last junction, but the consignee is not informed in a timely manner, this can cause the equipment to dwell at the destination and can cause loss of revenue to the consignees. The technology disclosed addresses the above-mentioned challenges by predicting the ETI for the equipment. The trained machine learning model allows the users (including the consignees, railroads, etc.) to predict estimated time of arrival (ETA) at any location along the trip route of the equipment from any other location along the trip route of the equipment. The starting location can be the origin station or origin junction, or it can represent a current location of the equipment along the trip route of the equipment.

Tree-based machine learning models such as gradient boosted tree and random forest are used for predicting ETA and ETI. Other types of machine learning models such as support vector regression and linear regression can also be used for predicting ETA and ETI. The technology disclosed gathers data from various sources for providing as input to the machine learning models. For example, data from the waybill is extracted for generating input to the machine learning models. Public and private data provided by various class one railroads are also used as input to machine learning models. Such data can include equipment event stream data such as 322 transactions for intermodal container movement on railroads and car location message (CLM) to track movement of railcars. The technology disclosed can also use data from various scheduling events related to the equipment or the trains. For example, train switches, crew changes, pickups and setouts, work orders, embargoes, track repairs, etc. Train switches indicate transfer of the equipment from one train to another train. Crew changes indicate change of crews on the train transporting the equipment. Pickups and setouts indicate adding or removing of equipment (i.e., railcars, tank cars, grain cars, etc.) from the train. The technology disclosed provides route related data such as lane data (extracted from the waybill) indicating junctions, class one railroads and last mile data (i.e., shortline journey) as input to the machine learning model for predicting ETA and ETI. The technology disclosed provides train level data such as train length and/or locomotive type to the machine learning models for predicting ETA and ETI. The length of a train can be represented as either in number of railcars (or other types of equipment) attached to the locomotive or as physical length of the train such as number of feet, etc. The technology disclosed also uses waybill data as input to the machine learning models for predicting ETA and ETI. The waybill data indicates whether the equipment is empty or loaded.

Various types of congestion are calculated along the route of the equipment from the origin location to the destination location. For example, the technology disclosed can determine track-level congestion and junction-level congestion. This congestion data is provided as input to the machine learning model for predicting the ETA and ETI. The technology disclosed provides seasonality data as input to the machine learning model for predicting ETA and ETI. Seasonality data indicates busy hours or off hours at the time of arrival at the junction or departure from the junction.

Commodity type data can also be provided as input to the machine learning model to predict ETA and ETI. The commodity type data indicates details of the cargo that is being transported in an equipment. The commodity type data can have an influence on the ETA and ETI as railroads assign different priorities to different types of cargo and/or commodities.

Events are generated as the train sends signals at various points along the journey. Events can be generated on train as well as on other locations along the track such as when the train passes certain points or when work orders are generated for a train, etc. The event data generated during the journey of the equipment from the origin location to the destination location is also referred to as time series data. The event-based data generated during the trip of the equipment is ingested, cleaned and prepared for providing as input to one or more machine learning models for predicting an up-to-date ETA and ETI for the equipment.

A variety of machine learning models can be trained and used for predicting ETA and ETI. For example, gradient boosted trees, random forest, support vector regression, linear regression, lasso regression, ridge regression, elastic net regression, Principal Component Analysis (PCA) and statistical analysis have been used by the technology disclosed for predicting ETAs and ETIs.

Gradient boosted trees or gradient boosted decision trees (XGBoost) is a machine learning ensemble technique that combines the predictions of multiple weak learners (or simple models), sequentially. The simple models or weak learners are usually decision trees. XGBoost attempts to improve the overall predictive performance by optimizing a model's weights based on the errors of previous iterations, gradually reducing prediction errors and enhancing the prediction accuracy. The technology disclosed trained a number of XGBoost models by systematically selecting different values of hyperparameters. A tree depth in the range of four to eight is used. Shorter trees with a depth in the range of four to eight are preferred for better performance of the model. Trained XGBoost models are used for predicting ETA and ETI.

System Overview

A system and various implementations of the technology to predict ETA and ETI is described with reference to FIGS. 1A-5.

FIG. 1A illustrates an example architectural-level schematic of a system that uses a trained machine learning model to predict, for a railroad equipment, an estimated time of arrival (ETA) and an estimated time to interchange (ETI). Because FIG. 1A is an architectural diagram, certain details are omitted to improve the clarity of the description. The discussion of FIG. 1A is organized as follows. First, the elements of the system are described, followed by their interconnections. Then, the use of the elements in the system is described in greater detail.

Freight trains play an important role in the economy by transporting a large amount of goods at a relatively reasonable transportation cost. However, current railroads are not highly predictable in their estimates of transportation times of these goods from origin to destination. This unpredictability in estimated times provided by railroads causes economic and productivity loss. FIG. 1A presents a system that can be used to improve the predictability of estimated times of arrivals of freight trains at their destinations.

This paragraph names labeled parts of the system presented in FIG. 1A. The system includes a machine learning-based ETA/ETI prediction engine 130. The prediction engine 130 is connected via network(s) 181 to more than one railroad management systems 120a to 120n. Signals from sensors attached to various types of equipment in a train 100 can be received by the prediction engine 130 via a combination of wireless communication network(s) 110 and network(s) 181. A training database 150 is accessible via the network(s) 181. The training database can store labeled training data that can be used to train an ETA/ETI prediction model 140. A calculated data database 160 is also accessible to the machine learning-based ETA/ETI prediction engine 130 via the network(s) 181. The machine learning-based ETA/ETI prediction engine 130 comprises a plurality of data processors 131 including a railroad data processor 132, a telematics data processor 136 and a calculated data processor 134. The machine learning-based ETA/ETI prediction engine 130 can include a plurality of trained ETA/ETI prediction models 140. Further details of the components of the machine learning-based ETA/ETI prediction engine are described below.

The machine learning-based ETA/ETI prediction engine 130 comprises of a trained ETA/ETI prediction model 140 that can be fed cleansed and formatted input data by a data preparer 138. The inputs 139 to the ETA/ETI prediction model 140 can comprise various types of data. For example, railroad data received from various railroad companies can be provided as input to the ETA/ETI prediction model 140. A railroad data processor 132 can include logic to parse and organize the railroad data for providing as input to the ETA/ETI prediction model 140. Data received from sensors attached to railroad equipment in a train 100 can be processed by a telematics data processor 136 for inputting to the ETA/ETI prediction model 140. A calculated data processor 134 includes logic to calculate various types of data such as track-level congestion and junction-level congestion, etc. The calculated data is then provided as input to the ETA/ETI prediction model for predicting ETA and/or ETI for a given equipment. The prediction engine 130 can include additional data processors to process data from other sources for input to the machine learning models. It is understood that the machine learning-based ETA/ETI prediction engine can comprise multiple prediction models. Separate machine learning models can be trained for predicting ETA and ETI for an equipment. A model can be selected based on the requirements of the user for predicting a particular estimate type (i.e., ETA or ETI). The trained machine learning model 140 outputs a predicted ETA or ETI for the equipment for which the inputs are provided to the model.

The machine learning-based ETA/ETI prediction engine 130 can receive railroad data from more than one railroad management systems 120a to 120n. The railroad data processor 132 includes logic to receive data from railroads and parse the received data to extract desired information regarding the equipment. The railroads generate a waybill for freight shipment from an origin location to a destination location. The waybill is received and parsed by the railroad data processor 132 to extract data related to an equipment. The waybill includes an ETA for the equipment's arrival at the destination. This ETA is provided by class one railroad. The waybill, however, does not include the ETI that indicates the estimated time of arrival of the equipment at the last interchange before the destination location. The equipment is handed over to a shortline railroad at the last interchange. The shortline railroad then transports the equipment from the last interchange to the destination. The machine learning-based prediction engine 130 includes trained machine learning model that predict ETI for the equipment. The railroad generates messages in response to various events during the trip of the equipment. These messages can be generated at various points during the trip such as when the train passes past certain places (e.g., junctions, stations, etc.) or when events (e.g., work orders, crew changes, setouts, pickups, etc.) related to the equipment occur. Railroads can transmit such data as car location messages (CLM). These messages are communicated in an encoded ASCII format that can be considered as a digital language used to electronically communicate event information. Car location message is a specialized message that is used by railroads to report the movement of railcars including intermodal containers. The technology disclosed can also receive and process other types of railroad transaction data that provides information about movement of railroad equipment. For example, the railroad data processor 132 can receive and parse EDI 322 transaction set that is also in the electronic data interchange (EDI) format. The EDI 322 transaction set can include data about various events related to the equipment such as departures, arrivals, ramp activities such as ingates, outgates, etc. The data received from railroad companies can be considered as event stream or equipment event stream. As new event data is received, the machine learning-based ETA/ETI prediction engine can input the new data to the prediction model 140 and predict updated ETA/ETI for the equipment.

Telematics data including location, temperature, power data for the equipment is captured by sensors installed on the equipment and sent to the telematics data processor 138. This data can be received by the telematics data processor 138 via satellite communications and wireless communication networks 110. The telematics data include location data of the equipment such as the GPS or global positioning system data. This information is more precise than the location data received from railroad companies that are based on rail sightings and other events. The sensors installed on the equipment can also send other data such as ambient temperature. Other data such as power settings, etc. can be received by the telematics data processor. The telematics data processor 136 can feed the telematics data to data preparer 138 for further inputting to the machine learning model 140 for predicting ETA/ETI for the equipment.

The calculated data processor 134 includes logic to calculate data related to the equipment using inputs received from various sources such as the railroad companies and/or telematics sensors installed on the equipment. The calculated data processor includes logic to calculate possible congestion on a junction or on any other location at a rail track. This calculated data can be used for identifying delays during the trip of the equipment. The calculated data processor can also determine seasonality data that can impact the ETA or ETI of the equipment. The seasonality data identifies hours in a day or days in a week that may have more traffic on junctions or tracks and may cause delays to movement of the equipment. The congestion data and the seasonality data calculated by the calculated data processor can be provided as input to the machine learning model 140 for predicting the ETA and ETI of the equipment. The calculated data processor 134 includes logic to calculate or infer data from equipment event data received from railroads. For example, the calculated data processor 134 can calculate a trip duration (in hours, days, etc.) for an equipment between any two locations along the trip route based on equipment update events received from the railroads.

The data preparer 138 includes logic to clean and format the data received from railroad companies so that it can be input the machine learning model 140. The data preparer completes the input data by inputting null values in the data fields in which the data is missing. The data preparer 138 includes logic to organize data in higher level features such as train types and equipment types that can be grouped together for inputting to the machine learning model. Categorical values are encoded (e.g., using one-hot encoding) by the data preparer 132 for inputting to the machine learning model 140.

The machine learning model 140 can produce an output 142 that predicts the ETA and/or the ETI for the equipment. The output from the machine learning model 140 can be presented on a graphical user interface that can show a map indicating a route of the equipment and a marker indicating the current location of the equipment. The output can also provide a comparison of the predicted ETA with the ETA from provided by the railroad via the waybill. This allows the users to easily identify when their shipment is going to arrive at the last junction (based on predicted ETI) and the destination location (based on predicted ETA).

Completing the description of FIG. 1A, the components of the system in FIG. 1A, described above, are all coupled in communication with the network(s) 181. The actual communication path can be point-to-point over public and/or private networks. The communications can occur over a variety of networks, e.g., private networks, VPN, MPLS circuit, RFID, or Internet, and can use appropriate application programming interfaces (APIs) and data interchange formats, e.g., Representational State Transfer (REST), Electronic Data Interchange (EDI), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, satellite network, point-to-point network, star network, token ring network, hub network, Internet, inclusive of the mobile Internet, via protocols such as EDGE, 3G, 4G LTE, Wi-Fi and WiMAX. The engines, data processors or system components of FIG. 1A are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Figure 1B:
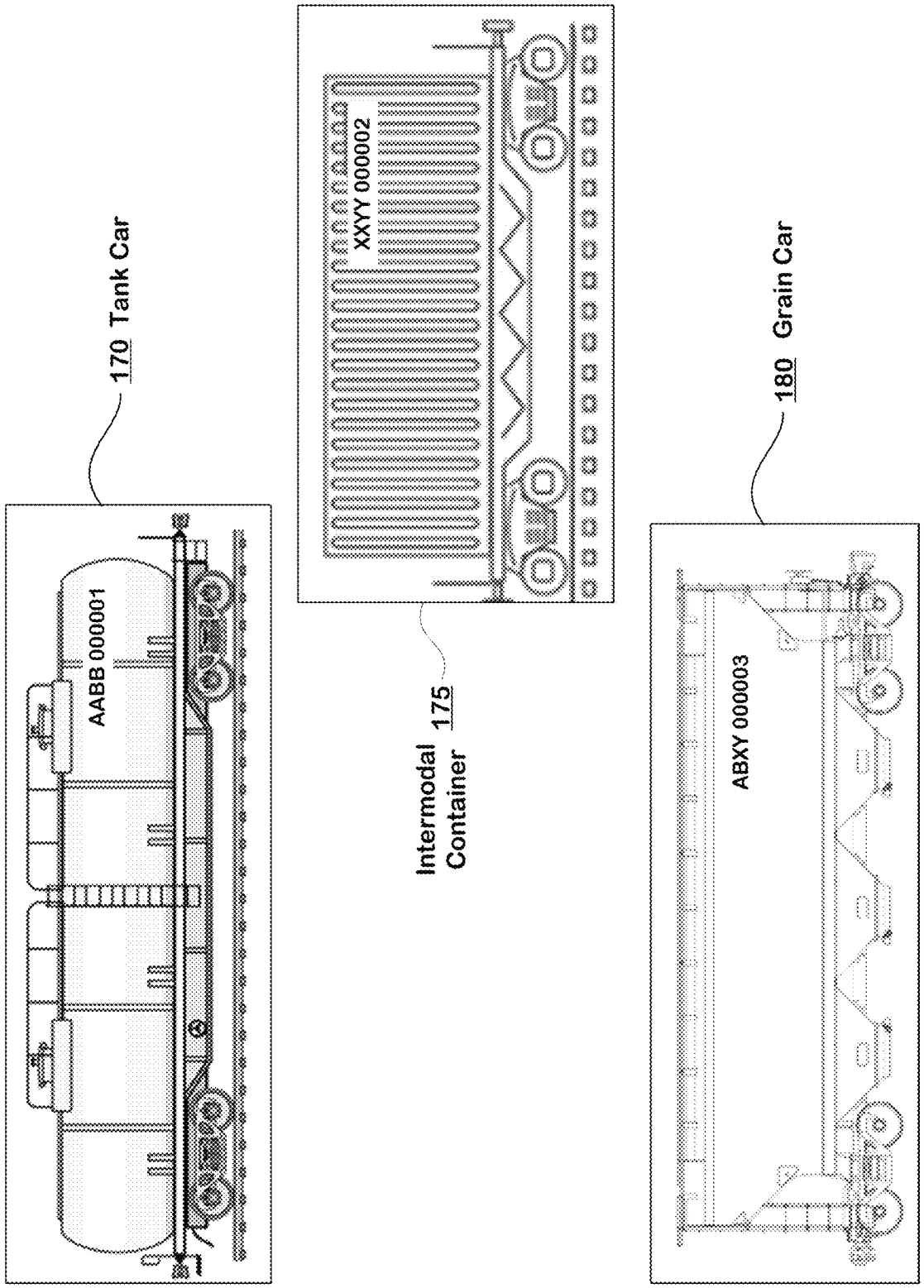
FIG. 1B presents examples of various types of railroad equipment that can be used to transport goods to a destination location.

FIG. 1B presents examples of various types of railroad equipment that can be used to transport goods to a destination location. A tank car (170) is used to transport oil, liquefied natural gas, chemicals or other types of liquids. An intermodal container 175 can be used to transport various types of packaged and unpackaged goods. An intermodal container can be transported in a container ship or on a road trailer (or truck). It can be placed and taken off from a railcar. Therefore, it is a versatile goods transportation equipment that can be used to transport goods via roads, railroads and oceans. A grain car 180 can be used to transport various types of grain to factories for processing. Examples of other types of equipment that can be tracked using the technology disclosed include, a box car, a refrigerated boxcar, a covered hopper, an open-top hopper, an autorack, a centerbeam, a coil car, a flatcar, a gandola, a well car, etc. It is understood that the technology disclosed can predict ETA and ETI for any equipment type that is transported by railroads.

A railcar or intermodal equipment is identified by an alphanumeric string that comprises two to four alphabets followed by six numerals. The equipment identifier is usually printed or painted on the equipment for identification purposes. A railroad company can assign priority to an equipment based on the type of the equipment. For example, a grain car may be assigned a lower priority than an intermodal container. This may cause a grain car to have a higher dwelling time than an intermodal container at a junction. The equipment type information is provided as an input to the trained ETA/ETI prediction model 140 so that the model can incorporate the priority information for the particular equipment when predicting the ETA and/or ETI. Similarly, the railroads can assign different priorities to various equipment types. The technology disclosed can use that priority information when predicting the ETA and/or ETI for an equipment of a particular type.

Figure 1C:
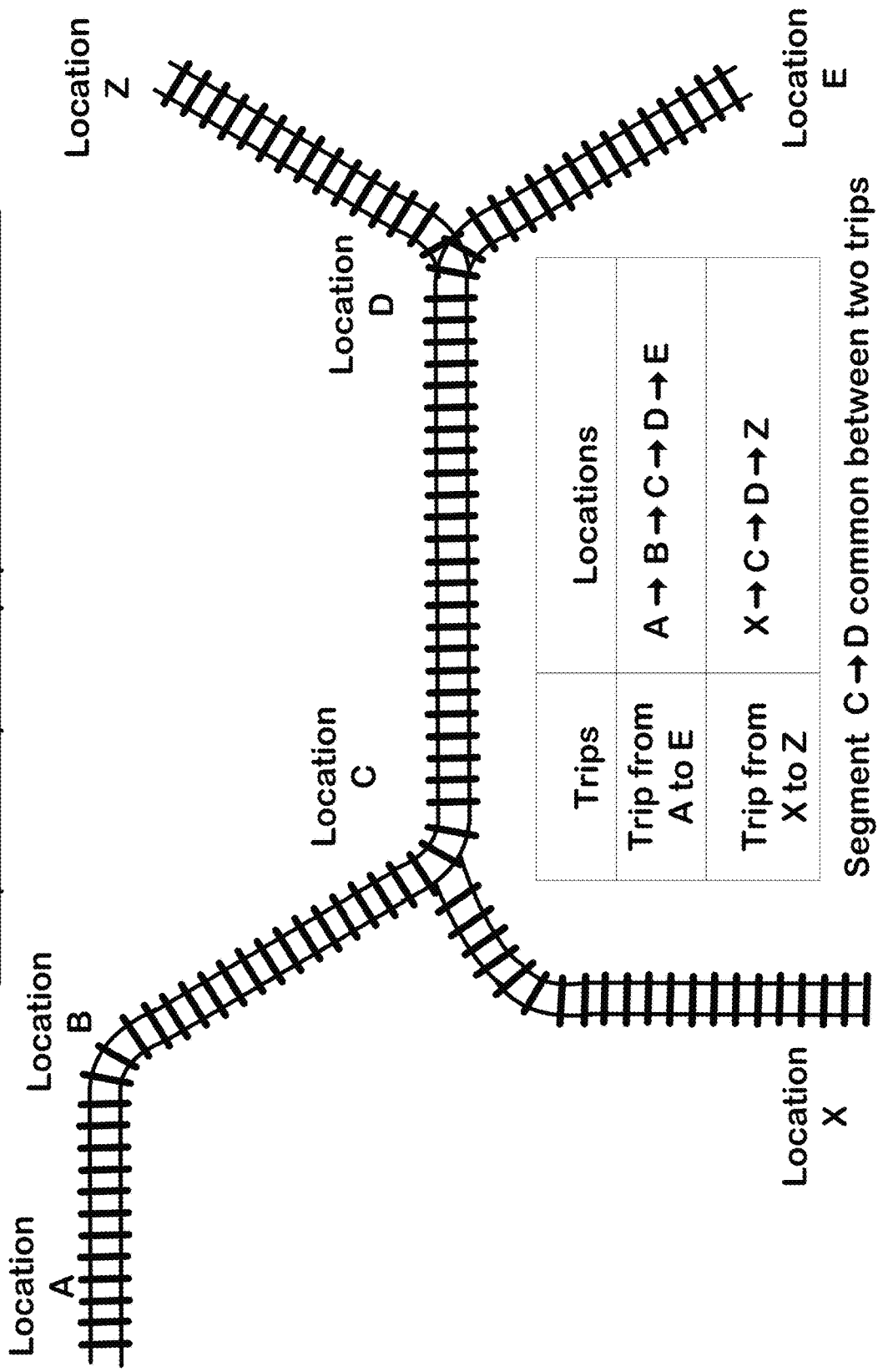
FIG. 1C presents examples of trips of equipment comprising starting locations and destination locations.

FIG. 1C presents examples of trips of equipment comprising starting locations and destination locations. Two example trips of equipment are shown via the railroad. A first trip starts from a location A and ends at a location E. A second trip starts from a location X and ends at a location Z. For the first trip, the equipment starts the journey from the location A and passes through locations B, C, D to reach the destination location E. For the second trip, the equipment starts the journey from the location X and passes through the locations C and D to reach the destination location Z. A trip can comprise multiple segments or routes (also referred to as shipment routes). For example, the first trip in FIG. 1C comprises four segments (or shipment routes) including a first segment from location A to location B, a second segment from location B to location C, a third segment from location C to location D and a fourth segment from location D to location E. Similarly, the second trip in FIG. 1C comprises three segments including a first segment from the location X to the location C, a second segment from the location C to the location D and a third segment from the location D to the location Z. Both trips have one segment (i.e., from location C to location D) as common between them.

The technology disclosed includes logic to identify segments (or shipment routes) in trips of equipment from source locations to destination locations. The technology disclosed can store various historical timeseries data for each segment or shipment route. For example, historical shipment route data including location identifier (such as location name, location identifier, SPLC, etc.) and corresponding timestamps indicating the time an equipment reached or passed through a location can be stored in the training database 150. Other data such as lane and junction congestion data, etc. can also be stored for one or more locations in a segment or shipment route. This historical shipment route data can be used to train machine learning models for predicting ETA and/or ETI for an equipment. The technology disclosed can combine historical shipment route data for different segments obtained from multiple historical trips to predict ETA and/or ETI for a trip between two locations for which there is no historical trip data. For example, referring to FIG. 1C, data for three historical trips ABCX, ZDE and XCDZ may be available. The technology disclosed can train the machine learning model using historical shipment route data from these three historical trips. The trained machine learning model can then predict ETA for a new trip ABCDE. This is possible because the machine learning model is trained using segments of the three historical trips. The machine learning model can then use historical shipment route data for segments from historical trip data to predict ETA for any location in the new trip without ever having received the historical trip data for the new trip ABCDE.

Input Data for ETA and ETI Prediction

Figure 2A:
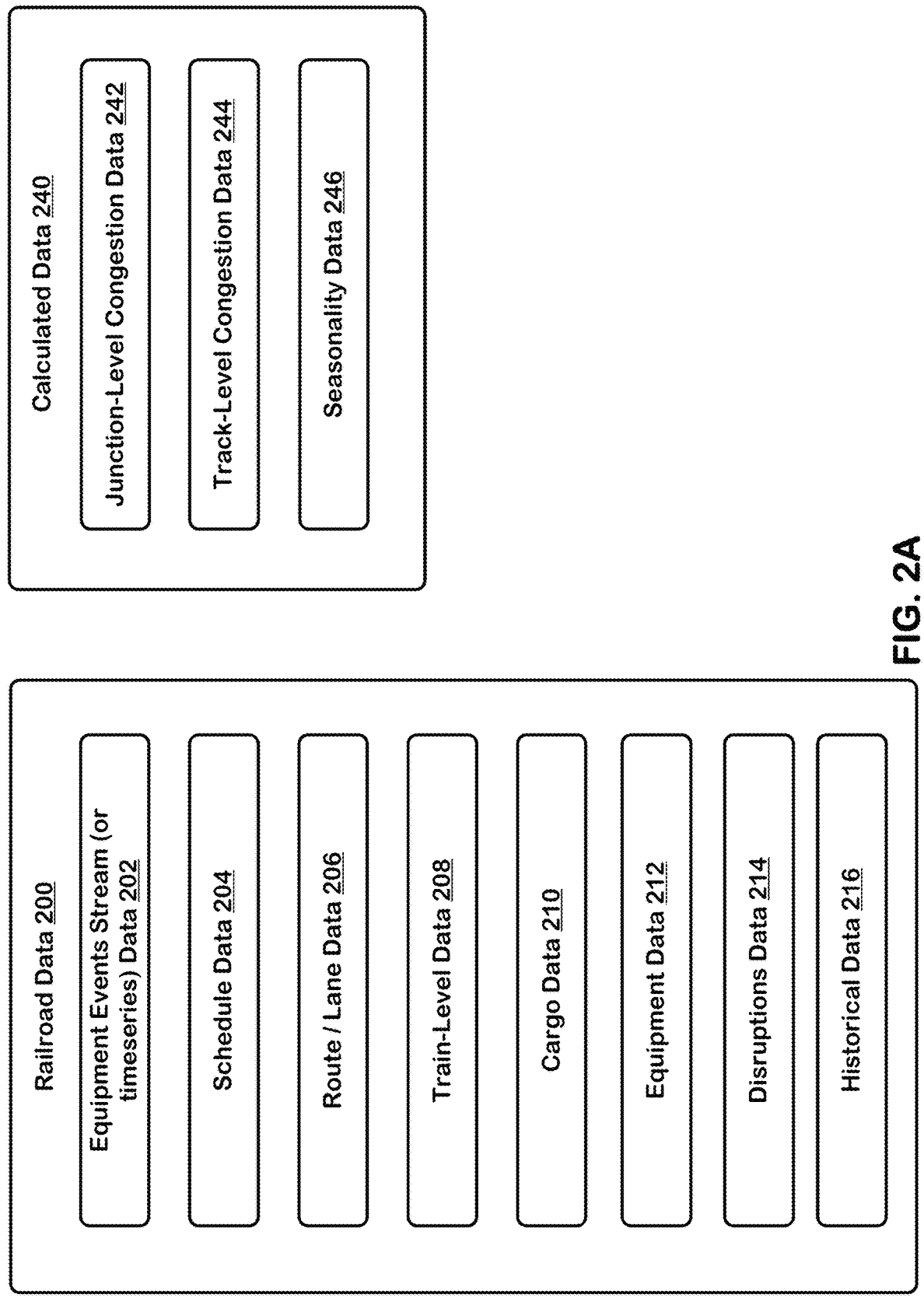
FIG. 2A presents examples of various types of data for example data categories to predict ETA and ETI for railroad equipment.
Figure 2B:
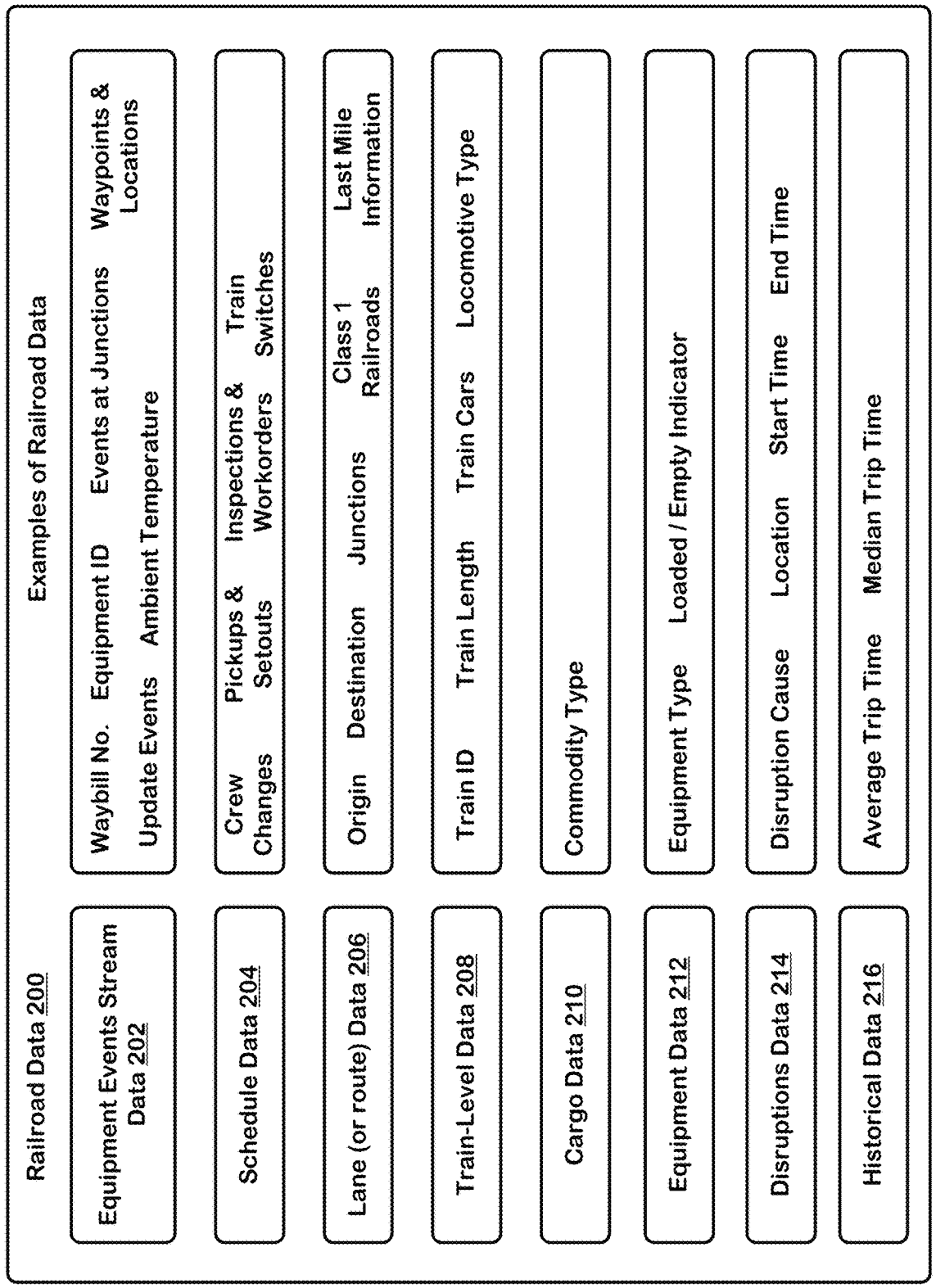
FIG. 2B presents examples of railroad data that can be used for predicting ETA and ETI for railroad equipment.

FIGS. 2A to 2C present details of the railroad data and calculated data including examples of data fields in each data category.

FIG. 2A presents examples of various types of data for example data categories to predict ETA and ETI for railroad equipment. Railroad data 200 can comprise an equipment events stream data 202 (also referred to as timeseries data). The equipment event stream data comprises data that is captured by railroads during the trip of the equipment from source to destination. The railroads capture this data at various locations during the trip of the equipment based on rail sightings or when the equipment passes past certain points including junctions, stations, signals, etc. The equipment event stream data can also be generated when events occur on the train or the equipment such as when the train and/or the equipment is held at a certain location or when workorders are generated for the equipment.

The railroad data 200 can also include schedule data 204 that includes data related to scheduled events. These scheduled events can be generated by railroad companies. The scheduled events can be related to maintenance of the equipment. Scheduled events can also be related to the crew operating the equipment and/or the train such as crew changes, etc. Other scheduled events may be related to the train such as train switches, etc. Train switches events indicate when the equipment is switched from one train to another. This may include switching from train operated by one railroad to a train operated by another railroad.

The railroad data 200 can include lane (or route) related data 206 such as junctions on the route, origin and destination, etc. Lane data can also include information related to various railroads that will handle the equipment during the trip from the origin to the destination. Lane data can include details related to the last mile indicating the shortline railroad that will handle the equipment after it is handed over to shortline at the last junction for onward journey to the destination. This data can be received from the waybill and/or various railroads involved in movement of the equipment from the origin to the destination.

The railroad data 200 can include train-level data 208 that identifies the train and other information related to the train such as a length of the train, locomotive type, etc.

The railroad data 200 can include cargo data 210 that can identify the commodity type being transported by the equipment.

The railroad data 200 can include equipment data 212 that can identify a type of the equipment and whether the equipment being moved is empty or loaded with goods.

The railroad data 200 can include disruptions data 214 that can identify various types of disruptions during the trip of the equipment. Details of each disruption can be provided by the railroad such as the cause of the disruption and start and end time of the disruption.

The railroad data 200 can include historical data 216 that can identify average times for a trip from a source to a destination location based on previously recorded actual trip data provided by railroad companies.

FIG. 2A also presents various types of calculated data 240 that can be used for predicting the ETA and ETI. The calculated data 240 can include congestion data. Two different types of congestion can be calculated by the calculated data processor 134. A first type of congestion is related to the junction (referred to as junction-level congestion data 242) and a second type of congestion is related to a particular location on the track (referred to as track-level congestion 244). The calculated data 240 can also include seasonality data 246 that identifies whether the time of the day or day of the week at which an equipment departs from a junction or arrives at a junction is a busy time or not. Busier times or days can cause delays in the movement of the equipment.

FIG. 2B presents examples of railroad data 200 that can be used for predicting ETA and ETI for railroad equipment. For each railroad data, some example data fields are presented. Note that the example data fields (in the right column) are presented for illustration purpose, additional data fields may be added for each railroad data (in the left column).

The equipment events stream data 202 can include data such as waybill identifier (or waybill number), equipment identifier (or equipment ID), a description or identifier of events at the junction, identifiers and/or descriptions of waypoints and locations along the path of the equipment, equipment update events including events at the origin and destination locations, ambient temperature, etc. The events at the origin and destination can include data related to pickup of the equipment and data related to delivery of the equipment. Equipment events stream data can also include telematics data received from various sensors and/or GPS systems installed on the equipment. Such telematics data can be sent by various types of sensors and/or GPS system installed on the equipment directly or via railroad network. The telematics data can include ambient temperature. Location data sent by the GPS can indicate equipment location that can be used by the machine learning model 140 when predicting ETA and ETI for the equipment.

The schedule data 204 can include schedule information related to the equipment and/or train such as crew changes, pickups and setouts details, inspections and work orders and train switches. These data fields are useful in prediction of ETA and ETI as scheduled events can cause delays in movement of the equipment.

The lane or route data 206 can include data related identifying the origin location, destination location, identifiers and/or names of junctions along a lane or a route of the equipment, names and/or identifiers of class one railroads that will handle movement of the equipment from the origin to the destination and name and/or identifier of the shortline railroad that will handle the movement of the train in the last mile.

The train-level data 208 includes details of the one or more trains that will move the equipment from the origin to the destination. The train-level data can include a train identifier (train ID), a train length, a number of railcars in the train, a locomotive type that powers the train. The train length can be measured in physical distance such as feet, miles, etc. or it can also be measured by the number of railcars or other types of equipment in the train.

The cargo data 210 can include information about the goods that are being transported. For example, it can include details of the commodity and/or goods being transported. Examples of commodities include oil, chemicals, liquified gas, grain, frozen goods, food items, etc.

The equipment data 212 can include details of the equipment. For example, it can include data related to the type of equipment (intermodal container, tank car, grain car, etc.). The equipment data can include data that identifies whether the equipment is loaded or empty.

The disruptions data 214 can include data related to disruptions during the trip of the equipment. The disruptions data can include a cause of the disruption, a location where the disruption occurred, a start time and an end time of the disruption.

The historical data 216 can include data generated based on historical trip data between different origin and destination locations. The historical data can include average trip times (e.g., in days) and median trip times (e.g., in days).

The technology disclosed can use selected data from the railroad data 200 to predict estimated time to arrival at a particular location. For example, in one implementation, the equipment events stream data 202, lane data 206 and historical data 216 can be used to predict ETA and/or ETI. Other data presented in FIG. 2B can be used to increase the prediction accuracy.

FIG. 2C presents examples of various types of calculated data 160 that can be used for predicting ETA and ETI for railroad equipment. The calculated data processor 132 include logic to use railroad data the calculate junction-level congestion data 242, track-level congestion data 244 and seasonality data 246. The junction-level congestion data 242 includes a predicted time at which congestion can occur at a particular junction. The congestion-level data 242 provides a junction name and/or identifier along with expected traffic at that junction at the predicted time. The expected traffic can identify a number of trains that are expected to pass through that junction at the predicted time. The predicted time can also be identified as a range of time such as 15 minutes, 30 minutes, one hour, two hours, three hours or more.

A track-level congestion data 244 can identify expected traffic at a particular location on the track at a predicted time. The location can be a particular geographic location identified by particular latitude and longitude values or identified by other geographical markers, waypoints, etc. In one implementation, the location can span between two geographical markers such as identified by two sets of latitude and longitude values or between two waypoints or between two location markers. The track-level congestion identifies expected traffic (i.e., number of trains) at the particular location (or between two location markers) at a predicted time. As in the case of junction-level congestion, the predicted time can also be identified as a range of time such as 15 minutes, 30 minutes, one hour, two hours, three hours or more. The calculated data 160 also includes seasonality data 246.

The seasonality data 246 can be determined from the railroad data. The seasonality data 246 identifies an hour of the day, a day of the week, a month of the year at which the equipment and/or the train departs from the origin location or arrives at the destination location. The seasonality data 246 identifies whether the equipment departs from origin location or arrives at the destination location at a busy hour or during off hours. This data can cause delays in movement of the equipment. Seasonality data can be determined for various junctions, stations or other waypoints or locations along which the equipment will travel during the trip.

Examples of Input Data for ETA and ETI Prediction

FIGS. 3A to 3E present examples of data that can be provided as input to machine learning model 140 for predicting ETA and ETI. The data can be received from railroad companies directly or as part of a waybill. Historical data can be calculated from the previous trips of equipment between different origin and destination locations. This data can be used for inputting to the machine learning model for predicting the ETA and/or ETI for an equipment's arrival at a destination. Examples of disruption data are also presented that are input to the machine learning model for predicting ETA and/or ETI. Examples of calculated data such as junction-level congestion data and track-level congestion data are also presented. Details of each data with reference to FIGS. 3A to 3E are presented below.

FIG. 3A presents example railroad data and calculated data that can be used for predicting ETA and ETI for railroad equipment. The data is presented in three tables 301, 311 and 321. A particular row in the three tables presents data related to an equipment and is identified by a waybill identifier. Updated data for the same equipment is received from the railroad at different times during the trip of the equipment from an origin location to a destination location. For example, the first three rows of the tables 301, 311 and 321 present railroad data for the waybill identifier (302) "12345" corresponding to the equipment identifier (304) "54321" and its location (305) as it moves from San Francisco, CA (first row) to Austin, TX (third row). The location 305 can be a city, state, or any other geographic location identified by latitude and longitude coordinates from a GPS system. The location can also be identified by a SPLC (standard point location code) as received from a railroad. The data received from the railroad includes the train identifier (303) "XXXXX". Timestamps (306) for arrivals at respective locations are also included in the record. Columns 307 to 310 present seasonality data as calculated by the calculated data processor 134 using the railroad data. A column 307 presents an hour of the day, a column 308 presents a day of the week, a column 309 presents a month of the year and a column 310 presents a value for the year. Columns 312 and 314 in table 311 provide scheduled crew changes and scheduled inspections for the trains moving the equipment. Column 315 presents a train type identifier. Column 316 presents a commodity type identifier and column 317 presents an equipment type identifier. Columns 318 and 319 provide train length (in feet) and train cars (in numbers) information for the respective trains. Table 321 presents scheduled pickups (320) and scheduled setout (323) for the respective equipment identifiers. An empty or loaded identifier for the respective equipment is presented in a column 324.

FIG. 3B presents example lane history data that can be used for predicting ETA and ETI for railroad equipment. A table 331 presents various historical data calculated in dependence on the historical trips of equipment between different locations. The lane history data, presented in a table 331, is arranged in rows. A row presents lane history data between an origin (332) and a destination (333) location for a given railcar type. The lane history data include an average trip time (334) and a median trip time (335). Both average and median trip times are expressed in number of days. The table 331 also presents median trip time in the last ninety days (336) and median trip time in the last one hundred and eighty days (337). The lane history data is used to train the machine learning model and the trained model is then used for predicting the ETA and/or ETI for an equipment. The example data presented in FIG. 3B can also include an equipment type field (not shown) identifying the type of the equipment such as railcar, tank car, grain car, etc.

FIG. 3C presents examples of railroad track repair disruptions data that can be used for predicting ETA and ETI for railroad equipment. A table 341 presents the track repair data. A row in the table 341 presents a record of a particular disruption to movement of a train. A column train identifier (or train ID) 346 presents the identifier for a train that has faced a disruption due to track repair. A column 342 presents the location (342) of the disruption. The start time (343) and end time (344) of the disruption are also presented in respective columns. For example, the first row in the table 341 shows that movement of a train with a train ID of "XXXXY" was disrupted at San Francisco, CA (location 342) from Mar. 1, 2024 (start time 343) to Mar. 3, 2024 (end time 344). The cause of this disruption is "track repair" presented in a column 345 labeled as "cause". The track repair disruption data can be used provided as input to the machine learning model 140 during inference when predicting ETA and/or ETI of the equipment.

FIG. 3D presents examples of calculated junction-level congestion data that can be used for predicting ETA and ETI for railroad equipment. Junction-level congestion data can be determined by the calculated data processor 134 using the railroad data received from various railroad companies. A table 351 presents an example of junction-level congestions calculated at various junctions. For example, the first row of table 351 presents congestion at Chicago, IL junction (354) at a predicted timepoint (353) of May 20, 2024, at six o'clock in the morning. The expected traffic at this junction is fifteen trains (355) at the predicted timepoint. The junction-level congestion data can be provided as input to the machine learning model for predicting ETA and/or ETI for an equipment. In one implementation, the junction-level congestion can be determined for a duration of time such as for thirty minutes, one hour, two hours, three hours, or more.

FIG. 3E presents examples of calculated track-level congestion data that can be used for predicting ETA and ETI for railroad equipment. Track-level congestion data can be determined by the calculated data processor 134 using the railroad data received from various railroad companies. A table 361 presents an example of track-level congestions calculated at various locations. A location is indicated by latitude and longitude values. Other forms of location markers such as waypoints, known places, etc. can be used for congestion calculation. In one implementation, track-level congestion can be calculated between two locations. The two locations can be identified by two sets of latitude and longitude values or by other location or position markers. The table 361 presents track-level congestions for various locations identified by their respective latitude and longitude values. For example, the first row of the table 361 presents congestion at a location 29.995629, −97.442271 (364) at a predicted timepoint (363) of May 20, 2024, at six o'clock in the morning. The expected traffic at this location is fifteen trains (365) at the predicted timepoint. The junction-level congestion data can be provided as input to the machine learning model for predicting ETA and/or ETI for an equipment.

FIGS. 3F to 3I present examples of raw event data and additional data that is determined or looked up from other sources using the raw event data. The raw event data can be received from railroad companies. FIG. 3I presents an example of raw event data by combining data from tables presented in FIGS. 3F, 3G and 3H.

FIG. 3F presents examples of raw event data received from railroad companies. This data can be received as part of a CLM (car location message) from a railroad. A table 371 includes four features labeled as "Equipment_ID", "Event Timestamp", "Event Code", and "Event SPLC". The data for these features is received from railroad companies. The Equipment_ID provides an identifier for the equipment for which the event is generated. The Event_Timestamp provides a timestamp (including a date and time) at which the event occurred. The Event_Code can include a code that indicates a type of the event. For example, an "A" event code indicates arrival of equipment at an in-transit railroad location other than the destination. A "J" event code indicates junction delivery for an equipment. This event indicates that the equipment is delivered from one railroad to another railroad. A "P" event code indicates departure of the equipment from an in-transit railroad location other than the destination. An "R" event code indicates the equipment is received by one railroad from another railroad. A "W" event code indicates that equipment is released at the date, time and location indicated. A "D" event code indicates arrival of equipment at a destination location. An "X" event code indicates that equipment is pulled from a shipper location at the date, time and location shown. The Event_SPLC feature provides a single point location code (SPLC) at which the event occurred. The SPLC can be used to identify a geographic location at which the event occurred.

FIG. 3G presents examples of location data related to the events in FIG. 3F. The location data can be determined using the raw event data from the railroad companies. A table 375 presents some examples of location data that can be determined from event data received from the railroad companies. An "Event_Description" field presents an event name or event description for the event provided by the railroad. The event description can be determined (or looked up) using the event code as listed in the table 371 in FIG. 3F. The location data (in table 375) also includes a "City" field that is determined using the location of the event in the event data received from the railroad. The location data (in table 375) includes the state, country and station names at which the event occurred. The location data also includes a junction name that can be determined using the location data received from the railroad. The location data can be determined using the single point location code (or SPLC) received in the event data from the railroad.

FIG. 3H presents additional data (in table 391) that can be determined or looked up using the Equipment_ID for the shipment being transported on a waybill. Such additional waybill data can include waybill number, waybill date, origin SPLC, destination SPLC and transportation type. The origin SPLC identifies the originating location of the equipment in a single point location code format. The destination SPLC identifies the destination location of the equipment in a single point location code format. The transportation type indicates the equipment type such as railcar, intermodal container, tank car, etc.

FIG. 3I presents a single raw event data example that includes event data received from railroad and other data that is determined or looked up using the event data. The example event data is a combination of the respective rows in tabular data presented in FIGS. 3F, 3G and 3H. The example event data includes the equipment identifier (or Equipment ID) "ABCX123456". The event occurred at an event timestamp of "2024-04-26 19:50:00". The event code is "W" and the event location is identified by the SPLC code value of "534485000". The preceding data is received as part of the event data from the railroad companies. Using one or more of the received event data values, other information about the event can be determined. For example, event description ("Released") can be determined from the event code ("W"). The location of the event can be determined using the event SPLC code ("534485000"). The location data can include the city ("Calamus") in which the event occurred, the country (US) in which the event occurred, the station ("Calamus") at which the event occurred or a nearby station if the event occurred away from the station and a junction at which the event occurred or a nearby junction at which the event occurred. Further data about the event can be determined using the Equipment ID to lookup the waybill. A waybill number ("654321"), waybill date ("2024-04-26") can be determined from the Equipment ID. An origin SPLC ("534485000") and a destination SPLC ("343570000") can be determined or looked up using the waybill number. A transportation type or equipment type ("railcar") can also be determined from the waybill number. Two or more features (or fields) in the raw event data can be used for training of the machine learning model for predicting ETA and/or ETI. For example, an equipment identifier, an event timestamp, an event code, an event SPLC, an origin SPLC, a destination SPLC can be used to train the machine learning model for predicting the ETA and/or ETI.

Example of a Machine Learning Model for ETA and ETI Prediction

Figure 4:
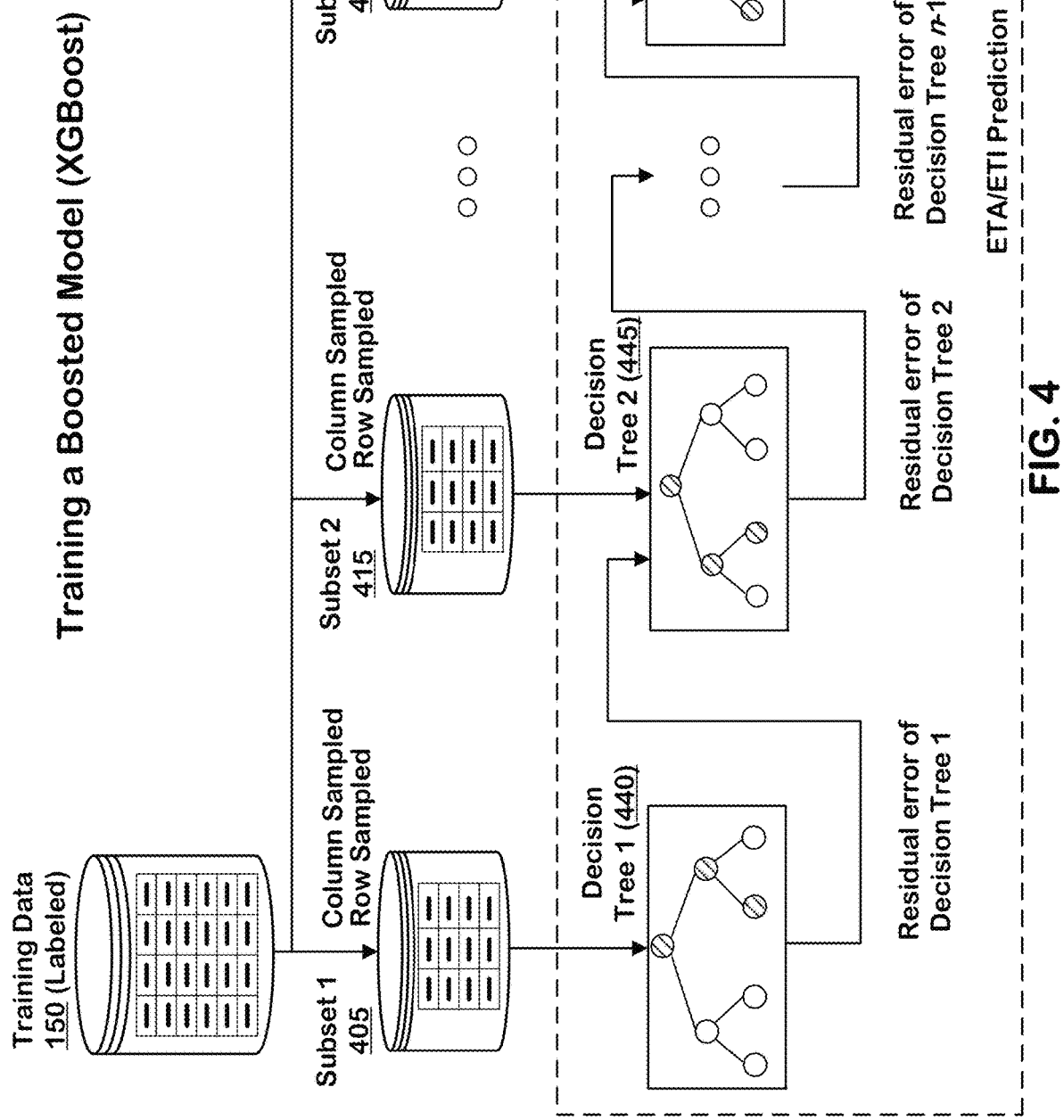
FIG. 4 illustrates training of a machine learning model that can be used for predicting ETA and ETI for railroad equipment.

FIG. 4 illustrates training of a machine learning model that can be used for predicting ETA and ETI for railroad equipment. The technology disclosed can use a variety of machine learning models for predicting ETA and ETI. These models can be trained using labeled training data. The training data comprises railroad data 200 and calculated data 240. As more data is collected from the railroads and sensors attached to the equipment, the size of the training data increases. Machine learning models such as gradient boosted trees, random forest, support vector regression, linear regression, lasso regression, ridge regression, elastic net regression, Principal Component Analysis (PCA) have been used by the technology disclosed for predicting ETAs and ETIs.

Details of training a gradient boosted trees (XGBoost) model for predicting ETA and ETI are presented with reference to FIG. 4 for illustration purposes. Gradient boosted trees (also referred to as gradient boosted decision trees) is an ensemble machine learning technique that sequentially combines the predictions of multiple simple (or weak) learners or models. XGBoost attempts to improve the overall predictive performance by optimizing a model's weights based on the errors of previous iterations, gradually reducing prediction errors and enhancing the prediction accuracy.

We briefly describe the hyperparameters and their ranges selected for training the XGBoost model. As more experiments are conducted, the ranges of the hyperparameters can change.

Learning rate is an important hyperparameter of the XGBoost model. The predictions of simple models (or weak learners) are summed (or added) together sequentially. In XGBoost, the weak learners are often decision trees. The contribution of each decision tree to the sum can be weighted to slow down the learning by the model. This weighting is called shrinkage or the learning rate. Smaller values of learning rate (close to zero) decrease the contribution of a weak learner in the ensemble. This requires building more decision trees and therefore increases the time to train the model. However, the final model is strong and resistant to overfitting. The range of learning rate values used for training the XGBoost is from 0.01 to 0.5.

The number of decision trees is another hyperparameter and is often referred to as the number of estimators (n_estimators) or number of boosting rounds. The value of this hyperparameter determines the number of trees to build in the ensemble model. Higher number of trees can result in a stronger model as more trees allow the model to capture more patterns in the data. However, this can also increase the chances of overfitting. The range of values used for the number of estimators hyperparameter is between five hundred (500) and two thousand (2000).

The max depth (or maximum depth) hyperparameter controls the number of levels in each weak learner or decision tree. For example, a max depth of three (3) means that there are three levels in the tree including the leaf level.

Deeper trees are more complex and computationally expensive. The max depth values for our XGBoost models range from four (4) to eight (8).

Subsampling (or row subsampling) hyperparameter determines the number of data samples (or rows) from the training data used to train each decision tree. A subsampling rate of less than one indicates that fewer data samples are randomly selected to train the model. The row subsample of 0.6 to 1 is used to train the XGBoost model.

Feature subsampling (or column subsampling) hyperparameter determines the number of features or columns that are selected for training a decision tree. XGBoost model is suitable when training data is arranged in tabular format. For large datasets with many features, we may want to reduce the number of features used for training a decision tree. The column subsample for the decision tree is selected in a range from 0.6 to 1.

Alpha regularization hyperparameter adds a penalty term to the loss function to reduce overfitting. Alpha hyperparameter is the L1 regularization term on model weights. When training an XGBoost model, we start with smaller values of alpha regularization and gradually increase until no further improvement in performance is achieved. We used alpha regularization values in a range from 0.01 to 1.

Lambda regularization hyperparameter also adds a penalty term to the loss function to reduce overfitting. Lambda hyperparameter is the L2 regularization term on model weights. We used lambda regularization values in a range from 0.01 to 1.

The objective hyperparameter is the loss function to be minimized. We have used root mean squared log error (RMSLE). RMSLE incurs a larger penalty for the underestimation of the actual variable than overestimation. More penalty is incurred when predicted value is less than the actual value and less penalty is incurred when predicted value is more than the actual value.

FIG. 4 presents a high-level overview of training the XGBoost model for predicting ETA and ETI. Separate models are trained for predicting the ETA and the ETI. Gradient boosted trees (or XGBoost) is an ensemble machine learning model and it uses boosting to train simple models (such as decision trees) in a sequential manner. Each decision tree learns from the mistakes of the previous model in the sequence of models. Due to sequential connections, boosted models are slow to learn but they perform better.

Using the selected hyperparameter values for rows and column subsampling, smaller datasets or subsets are generated for training the learners or decision trees. For example, a subset 1 (405) is selected from the labeled training database 150 for input to the first decision tree (440). The error from the first decision tree (440) is passed to the second decision tree (445). The second decision tree receives a subset 2 (415) from the training database 150. The second decision tree (445) then attempts to fit to the residuals of the first decision tree so that it improves the performance of the model overall. The process is repeated with the nth decision tree (450) that receives a subset n (420) from the training database 150. The trained model 140 can then be used for predicting ETA and/or ETI.

The data used to train the model can include example data such as presented in tables in FIGS. 3A to 3I. In one implementation, the machine learning model as shown in FIG. 4 is trained using up to one million examples (or samples). The machine learning model can perform well even when trained with smaller data sets including up to a hundred or more samples. The training data is split for training and validation. Around 20 percent of the training data is used for validation. It is understood that the size of the training data can increase as more data is collected from various railroads over time. The example data presented in various tables in FIGS. 3A to 3I can be combined in one table. This combined tabular data is then used for training the model as shown in FIG. 4. Different rows and features (columns) can be selected for training different decision trees in the model. Similarly, this tabular data can be used for predicting an ETA or ETI. The features can be aggregated at the freight shipment level so that different hierarchies of information are available to the machine learning model when predicting an ETA or ETI. The machine learning model can be trained to predict estimated time to arrival for any location in the trip route of the equipment from any other location in the trip route.

In one implementation, the machine learning models for predicting ETA and/or ETI can be trained using selected features from example data as shown in FIGS. 3A to 3I. These models can be used to improve the accuracy of predicted ETAs and/or ETIs by using such features in inference or production. For example, when more training data is available for ETAs and/or ETIs for particular equipment type or crew information, etc. separate machine learning models can be trained using this data. Such models can then be used to predict ETA and/or ETI when the particular data, on which these models are trained, is available in inference.

Computer System

Figure 5:
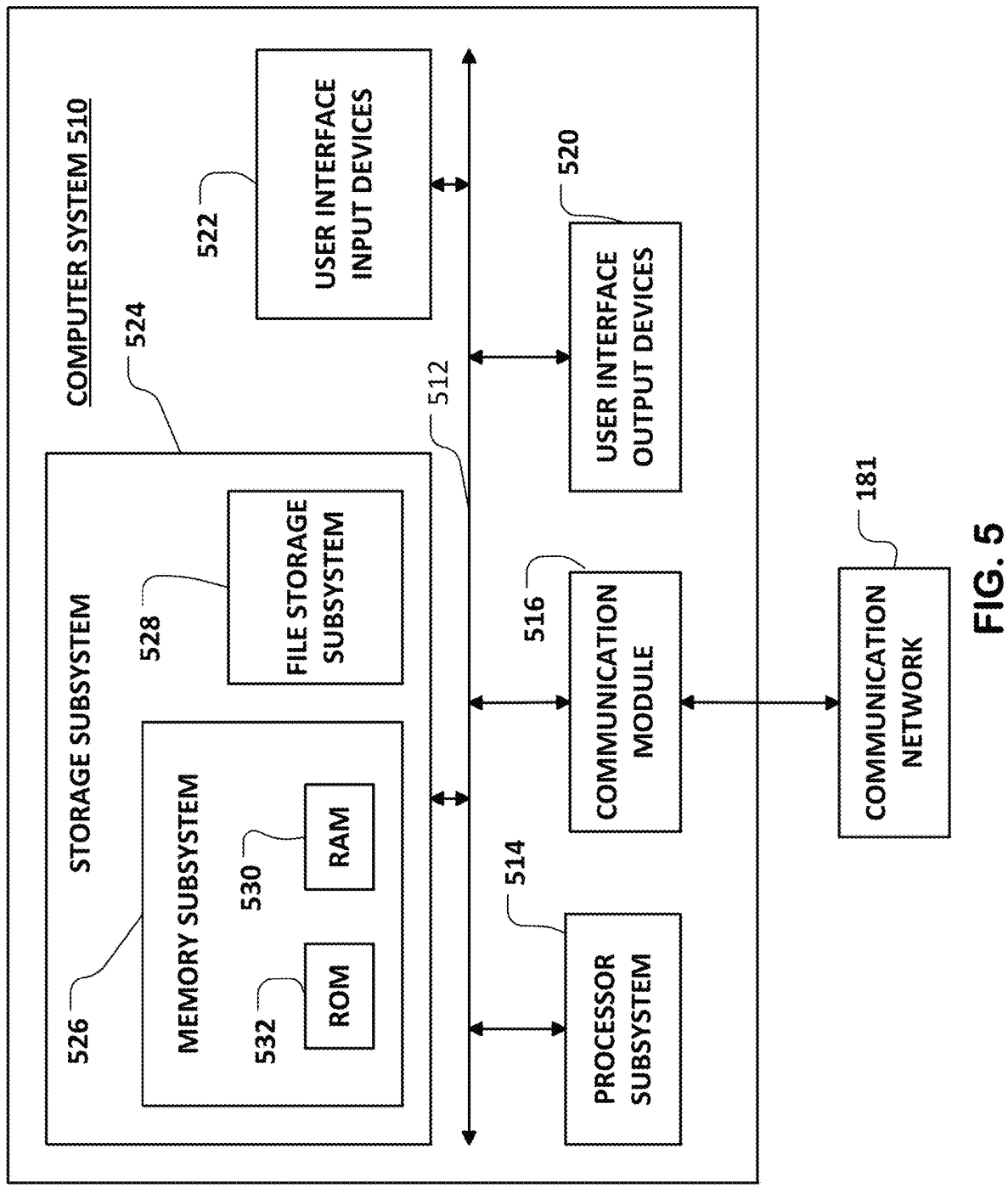
FIG. 5 is a computer hardware arrangement configured for hosting the machine learning-based ETA/ETI prediction engine of FIG. 1A.

FIG. 5 is a computer hardware arrangement configured for hosting the machine learning-based ETA/ETI prediction engine of FIG. 1A.

FIG. 5 presents a simplified block diagram of a computer system, or network node, which can be used to implement the functions of the machine learning-based ETA/ETI prediction engine. A computer system typically includes a processor subsystem 514 which communicates with a number of peripheral devices via bus subsystem 512. These peripheral devices may include a storage subsystem 524, comprising a memory subsystem 526 and a file storage subsystem 528, user interface input devices 522, user interface output devices 520, and a communication module 516. The input and output devices allow user interaction with the computer system. Communication module 516 provides physical and communication protocol support for interfaces to outside networks, including an interface to communication network 181, and is coupled via communication network 181 to corresponding communication modules in other computer systems. Communication network 181 may comprise many interconnected computer systems and communication links. These communication links may be wireline links, optical links, wireless links, or any other mechanisms for communication of information, but typically it is an IP-based communication network, at least at its extremities. While in one embodiment, communication network 181 is the Internet, in other embodiments, communication network 181 may be any suitable computer network.

The physical hardware component of network interfaces is sometimes referred to as network interface cards (NICs), although they need not be in the form of cards: for instance, they could be in the form of integrated circuits (ICs) and connectors fitted directly onto a motherboard, or in the form of macrocells fabricated on a single integrated circuit chip with other components of the computer system.

User interface input devices 522 may include a keyboard, pointing devices such as a mouse, trackball, touchpad, or graphics tablet, a scanner, a touch screen incorporated into the display, audio input devices such as voice recognition systems, microphones, and other types of tangible input devices. In general, use of the term "input device" is intended to include all possible types of devices and ways to input information into the computer system or onto computer network.

User interface output devices 520 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computer system to the user or to another machine or computer system.

Storage subsystem 524 stores the basic programming and data constructs that provide the functionality of certain embodiments of the technology disclosed. For example, the various modules implementing the functionality of certain embodiments of the technology disclosed may be stored in storage subsystem 524. These software modules are generally executed by processor subsystem 514.

Memory subsystem 526 typically includes a number of memories including a main random-access memory (RAM) 530 for storage of instructions and data during program execution and a read only memory (ROM) 532 in which fixed instructions are stored. File storage subsystem 528 provides persistent storage for program and data files, and may include a hard disk drive, a floppy disk drive along with associated removable media, a CD ROM drive, an optical drive, or removable media cartridges. The databases and modules implementing the functionality of certain embodiments of the technology disclosed may have been provided on a computer readable medium such as one or more CD-ROMs and may be stored by file storage subsystem 528. The host memory 526 contains, among other things, computer instructions which, when executed by the processor subsystem 514, cause the computer system to operate or perform functions as described herein. As used herein, processes and software that are said to run in or on the "host" or the "computer," execute on the processor subsystem 514 in response to computer instructions and data in the host memory subsystem 526 including any other local or remote storage for such instructions and data.

Bus subsystem 512 provides a mechanism for letting the various components and subsystems of a computer system communicate with each other as intended. Although bus subsystem 512 is shown schematically as a single bus, alternative embodiments of the bus subsystem may use multiple buses.

The computer system 510 itself can be of varying types including a personal computer, a portable computer, a workstation, a computer terminal, a network computer, a television, a mainframe, a virtual private server, a docker container, a server farm, or any other data processing system or user device. In one embodiment, a computer system includes several computer systems. Due to the ever-changing nature of computers and networks, the description of computer system 510 depicted in FIG. 5 is intended only as a specific example for purposes of illustrating the preferred embodiments of the technology disclosed. Many other configurations of the computer system are possible having more or less components than the computer system depicted in FIG. 5. The same components and variations can also make up each of the other devices and/or engines and the databases in the environment of FIG. 1A, as well as the devices and/or engines and the databases as shown in FIG. 1A.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present technology may consist of any such feature or combination of features. In view of the foregoing description, it will be evident to a person skilled in the art that various modifications may be made within the scope of the technology.

The foregoing description of preferred embodiments of the present technology has been provided for the purposes of illustration and description. It is not intended to be exhaustive or to limit the technology to the precise forms disclosed. Obviously, many modifications and variations will be apparent to practitioners skilled in this art. Any and all variations described, suggested or incorporated by reference herein with respect to any one embodiment are also to be considered taught with respect to all other embodiments. The embodiments described herein were chosen and described in order to best explain the principles of the technology and its practical application, thereby enabling others skilled in the art to understand the technology for various embodiments and with various modifications as are suited to the particular use contemplated. It is intended that the scope of the technology be defined by the following claims and their equivalents.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to specific implementations thereof, these specific implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, a coarse-grained reconfigurable architecture (CGRA), or in a programmable logic device such as a field-programmable gate array (FPGA), obviating the need for at least part of any dedicated hardware. Implementations may be as a single chip, or as a multi-chip module (MCM) packaging multiple semiconductor dies in a single package. All such variations and modifications are to be considered within the ambit of the disclosed technology the nature of which is to be determined from the foregoing description.

Any suitable programming language can be used to implement the routines of specific implementations including Python, C, C++, Java, JavaScript, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different specific implementations. In some specific implementations, multiple steps shown as sequential in this specification can be performed at the same time.

Specific implementations may be implemented in a tangible, non-transitory computer-readable storage medium for use by or in connection with the instruction execution system, apparatus, board, or device. Specific implementations can be implemented in the form of control logic in software or hardware or a combination of both. The control logic, when executed by one or more processors, may be operable to perform that which is described in specific implementations. For example, a tangible non-transitory medium such as a hardware storage device can be used to store the control logic, which can include executable instructions.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

It will also be appreciated that one or more of the elements depicted in the drawings/figures can also be implemented in a more separated or integrated manner, or even removed or rendered as inoperable in certain cases, as is useful in accordance with a particular application.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope and spirit as set forth. Therefore, many modifications may be made to adapt a particular situation or material to the essential scope and spirit.

What is claimed is:

1. A method of predicting an estimated time of arrival for an equipment via a railroad, the method including:
   inputting to a trained machine learning model a shipment data that includes a starting location for a particular trip and a destination location for the particular trip, and at least one event data generated in response to an event during the particular trip of the equipment via the railroad from the starting location for the particular trip to the destination location for the particular trip,
   wherein the event is a location update event that indicates movement of the equipment in proximity to a particular geographic location along the particular trip, and
   wherein the particular geographic location is any location between the starting location and the destination location and the particular geographic location is identified by corresponding geographical coordinates
   predicting, using the trained machine learning model, the estimated time of arrival of the equipment at the destination location for the particular trip when no historical trip data exists for the particular trip; and
   wherein the trained machine learning model uses an ensemble of tree models for the predicting of the estimated time of arrival of the equipment at the destination location,
   wherein the ensemble of tree models sequentially combines predictions of multiple tree models arranged in a sequence of models, a particular model in the sequence of models is trained using a first subset of training data, and
   wherein during training, a prediction error from the particular model is passed to a succeeding model in the sequence of models, the succeeding model is trained using a second subset of training data and the succeeding model optimizes model weights based on the prediction error from the particular model to gradually reduce prediction errors and enhance prediction accuracy.

2. The method of claim 1, wherein the event identifies at least one of a location arrival event identifying arrival of the equipment at the location, a location departure event identifying departure of the equipment from the location, a hold event identifying delay of the equipment at the location, a junction delivery event identifying delivery of the equipment from one railroad to another railroad, a junction receipt event identifying receipt of the equipment by one railroad from another railroad and a storage event identifying storage of the equipment at the location.

3. The method of claim 1, further including,
   inputting to the trained machine learning model an equipment type data indicating a type of the equipment moving a cargo from the starting location to the destination location wherein the equipment type identifies at least one of an intermodal container, a railcar, a tank car, a box car, a refrigerated boxcar, a covered hopper, an open-top hopper, a grain container, an autorack, a centerbeam, a coil car, a flatcar, a gondola and a well car.

4. The method of claim 1, wherein the destination location for the particular trip is any location along a route of the particular trip of the equipment.

5. The method of claim 1, further including: predicting an updated estimated time of arrival of the equipment at the destination location by inputting, to the trained machine learning model, at least one new event data, generated in response to a new event during the particular trip of the equipment from the starting location to the destination location.

6. The method of claim 5, wherein the new event is at least one of an arrival event indicating arrival of the equipment at a location, a departure event indicating departure of the equipment from the location, a hold event indicating delay of the equipment at a location, a junction delivery event indicating delivery of the equipment from one railroad to another railroad, and a junction receipt event indicating receipt of the equipment by one railroad from another railroad, and a storage event indicating storage of the equipment.

7. The method of claim 1, wherein the event data comprises at least a time, a date and a location of the event.

8. The method of claim 1, wherein the machine learning model is trained using a plurality of historical shipment route data for a plurality of corresponding segments, a particular historical shipment route data in the plurality of historical shipment route data comprising at least a location and a corresponding timestamp in a particular segment starting from a segment starting location for the particular segment and ending at a segment destination location for the particular segment, the method further including,
  inputting to the trained machine learning model, at least one event data generated in response to a scheduling event during the particular trip of the equipment,
  wherein the historical shipment route data used to train the machine learning model further include a plurality of historical schedule data, a particular historical schedule data comprises at least one event data generated in response to the scheduling event.

9. The method of claim 8, wherein the scheduling event includes at least one of a train switches event indicating the switching of the equipment from one railroad to another railroad, a crew changes event indicating changes of the crew during the particular trip of the equipment, a work order event indicating part replacement or inspection of the equipment, a pickup event indicating adding of the equipment to the train and a setout event indicating removal of the equipment from the train.

10. The method of claim 5, wherein the new event is a junction-level congestion event indicating delay to movement of the equipment at a junction during the particular trip.

11. The method of claim 10, further including:
  determining a number of trains that are scheduled on at least one junction in the railroad during a specified future time interval;
  calculating, using the determined number of trains, at least one of an average and a maximum amount of junction congestion along a lane for a particular waybill as a junction-level congestion; and
  inputting to the trained machine learning model the junction-level congestion as input data for the junction-level congestion event for the particular trip.

12. The method of claim 11, wherein the particular waybill further includes an identifier of the at least one junction, an identifier of at least one class one railroad and an identifier of at least one last mile track.

13. The method of claim 1, further including, inputting to the trained machine learning model a length of a train wherein the length of the train is determined by a number of equipment in the train.

14. The method of claim 1, further including, inputting to the trained machine learning model a Boolean flag indicating whether the equipment is loaded with cargo.

15. The method of claim 1, further including, inputting to the trained machine learning model a commodity type wherein the commodity type indicates a type of cargo being transported by the equipment.

16. The method of claim 2, further including, inputting to the trained machine learning model a seasonality data associated with at least one of the location departure event and the location arrival event wherein the seasonality data comprises at least one of a time of a day, a day of a week, a month of an year and a Boolean for indicating a higher than average traffic at the location.

17. A system including one or more processors coupled to memory, the memory loaded with computer instructions to predict an estimated time of arrival for an equipment via a railroad, the instructions, when executed on the processors, implement, at a server node, actions comprising:
  inputting to a trained machine learning model a shipment data that includes a starting location for a particular trip and a destination location for the particular trip, and at least one event data generated in response to an event during the particular trip of the equipment via the railroad from the starting location for the particular trip to the destination location for the particular trip, wherein the event is a location update event that indicates movement of the equipment in proximity to a particular geographic location along the particular trip, and
  wherein the particular geographic location is any location between the starting location and the destination location and the particular geographic location is identified by corresponding geographical coordinates
  predicting, using the trained machine learning model, the estimated time of arrival of the equipment at the destination location for the particular trip when no historical trip data exists for the particular trip; and
  wherein the trained machine learning model uses an ensemble of tree models for the predicting of the estimated time of arrival of the equipment at the destination location,
  wherein the ensemble of tree models sequentially combines predictions of multiple tree models arranged in a sequence of tree models, a particular tree model in the sequence of tree models is trained using a first subset of training data, and
  wherein during training, a prediction error from the particular tree model is passed to a succeeding tree model in the sequence of tree models, the succeeding tree model is trained using a second subset of training data and the succeeding tree model optimizes model weights based on the prediction error from the particular tree model to gradually reduce prediction errors and enhance prediction accuracy.

18. A non-transitory computer readable storage medium impressed with computer program instructions to predict an estimated time of arrival for an equipment via a railroad, the instructions, when executed on a processor, implement a method, of a server node, comprising:
  inputting to a trained machine learning model a shipment data that includes a starting location for a particular trip and a destination location for the particular trip, and at least one event data generated in response to an event during the particular trip of the equipment via the railroad from the starting location for the particular trip to the destination location for the particular trip, wherein the event is a location update event that indicates movement of the equipment in Proximity to a particular geographic location along the particular trip,
  wherein the particular geographic location is any location between the starting location and the destination location and the particular geographic location is identified by corresponding geographical coordinates
  predicting, using the trained machine learning model, the estimated time of arrival of the equipment at the destination location for the particular trip when no historical trip data exists for the particular trip; and
  wherein the trained machine learning model uses an ensemble of tree models for the predicting of the estimated time of arrival of the equipment at the destination location,
  wherein the ensemble of tree models sequentially combines predictions of multiple tree models arranged in a sequence of tree models, a particular tree model in the sequence of tree models is trained using a first subset of training data, and wherein during training, a prediction error from the particular tree model is passed to a succeeding tree model in the sequence of tree models, the succeeding tree model is trained using a second subset of training data and the succeeding tree model optimizes model weights based on the prediction error from the particular tree model to gradually reduce prediction errors and enhance prediction accuracy.

19. A method of predicting an estimated time of arrival for an equipment via a railroad, the method including:

inputting to a trained machine learning model a starting location for a particular trip, a destination location for the particular trip, at least one event data generated in response to an event during the particular trip of the equipment via the railroad from the starting location for the particular trip to the destination location for the particular trip, wherein the event is a location update event that indicates movement of the equipment in proximity to a particular geographic location along the particular trip, wherein the particular geographic location is any location between the starting location and the destination location and the particular geographic location is identified by corresponding geographical coordinates and predicting, using the trained machine learning model, the estimated time of arrival of the equipment at a particular junction at which the equipment is handed over by a class one railroad to a shortline railroad when no historical trip data exists for the particular trip, wherein the particular junction is located between the starting location for the particular trip and the destination location for the particular trip, wherein the trained machine learning model uses an ensemble of tree models for the predicting of the estimated time of arrival of the equipment at the destination location, wherein the ensemble of tree models sequentially combines predictions of multiple tree models arranged in a sequence of tree models, a particular tree model in the sequence of tree models is trained using a first subset of training data, and wherein during training, a prediction error from the particular tree model is passed to a succeeding tree model in the sequence of tree models, the succeeding tree model is trained using a second subset of training data and the succeeding tree model optimizes model weights based on the prediction error from the particular tree model to gradually reduce prediction errors and enhance prediction accuracy.

20. The method of claim 19, wherein the machine learning model is trained using a Plurality of historical shipment route data for a Plurality of corresponding segments, a particular historical shipment route data in the plurality of historical shipment route data comprising at least a location and a corresponding timestamp in a particular segment starting from a segment starting location for the particular segment and ending at a segment destination location for the particular segment, and wherein the particular historical shipment route data in the plurality of historical shipment route data matches at least a portion of the particular trip of the equipment from the starting location to the destination location.

21. The method of claim 19, wherein the event identifies at least one of a hold event identifying delay of the equipment at the location, a junction delivery event identifying delivery of the equipment from one railroad to another railroad, and a junction receipt event identifying receipt of the equipment by one railroad from another railroad and a storage event identifying storage of the equipment at the location.

22. The method of claim 19, wherein the destination location for the particular trip is any location along a route of the particular trip of the equipment.

* * * * *